(12) United States Patent
Watanabe

(10) Patent No.: US 9,505,393 B2
(45) Date of Patent: Nov. 29, 2016

(54) BRAKE DEVICE

(71) Applicant: Hitachi Automotive Systems, Ltd., Hitachinaka-shi, Ibaraki (JP)

(72) Inventor: Asahi Watanabe, Fujisawa (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 63 days.

(21) Appl. No.: 14/405,613

(22) PCT Filed: May 20, 2013

(86) PCT No.: PCT/JP2013/063912
§ 371 (c)(1),
(2) Date: Dec. 4, 2014

(87) PCT Pub. No.: WO2013/183431
PCT Pub. Date: Dec. 12, 2013

(65) Prior Publication Data
US 2015/0175144 A1 Jun. 25, 2015

(30) Foreign Application Priority Data

Jun. 6, 2012 (JP) ................................ 2012-128585

(51) Int. Cl.
*B60T 8/90* (2006.01)
*B60T 17/22* (2006.01)
(Continued)

(52) U.S. Cl.
CPC ............ *B60T 17/221* (2013.01); *B60T 8/4045* (2013.01); *B60T 8/4081* (2013.01); *B60T 8/90* (2013.01);
(Continued)

(58) Field of Classification Search
CPC .... B60T 13/16; B60T 13/161; B60T 13/168; B60T 13/18; B60T 13/686; B60T 13/662; B60T 17/22; B60T 17/221; B60T 17/222; B60T 2270/403; B60T 2270/406; B60T 8/4045; B60T 8/4081; B60T 8/90; B60T 8/92; B60T 8/94; B60T 8/88; B60T 8/4054
See application file for complete search history.

(56) References Cited

U.S. PATENT DOCUMENTS

2001/0045772 A1 11/2001 Schmidt et al.
2002/0030404 A1* 3/2002 Nitta .................... B60T 8/4036
303/122.12

(Continued)

FOREIGN PATENT DOCUMENTS

JP 11-348759 A 12/1999
JP 2006-306272 A 11/2006
(Continued)

OTHER PUBLICATIONS

International Search Report (PCT/ISA/210) dated Jun. 18, 2013, with English translation (Five (5) pages).

*Primary Examiner* — Anna Momper
(74) *Attorney, Agent, or Firm* — Crowell & Moring LLP

(57) ABSTRACT

It is an object of the invention to provide a brake device capable of detecting a failure in each of components, by which booster control is performed, at an early stage even during vehicle running. The brake device is configured to discharge brake fluid into a communicating fluid path that connects a fluid path of a primary system and a fluid path of a secondary system, and to control a first communicating valve for restricting a flow of brake fluid from the communicating fluid path to the fluid path of the primary system and a second communicating valve for restricting a flow of brake fluid from the communicating fluid path to the fluid path of the secondary system in respective valve-closing directions, so as to check at least a state of the pump.

13 Claims, 15 Drawing Sheets

(51) Int. Cl.
*B60T 13/18* (2006.01)
*B60T 8/92* (2006.01)
*B60T 8/40* (2006.01)
*B60T 13/16* (2006.01)
*B60T 17/18* (2006.01)
*B60T 13/14* (2006.01)
*B60T 13/66* (2006.01)
*B60T 13/68* (2006.01)
*B60T 8/36* (2006.01)

(52) U.S. Cl.
CPC ............... *B60T 8/92* (2013.01); *B60T 13/14* (2013.01); *B60T 13/146* (2013.01); *B60T 13/168* (2013.01); *B60T 13/662* (2013.01); *B60T 13/686* (2013.01); *B60T 17/18* (2013.01); *B60T 17/22* (2013.01); *B60T 17/222* (2013.01); *B60T 8/3655* (2013.01); *B60T 8/4054* (2013.01); *B60T 13/18* (2013.01)

(56) References Cited

U.S. PATENT DOCUMENTS

| | | | |
|---|---|---|---|
| 2002/0035832 A1* | 3/2002 | Nakamura | B60T 8/4081 60/413 |
| 2006/0066146 A1* | 3/2006 | Otomo | B60T 8/26 303/151 |
| 2008/0234909 A1 | 9/2008 | Iwasaki et al. | |

FOREIGN PATENT DOCUMENTS

| | | | |
|---|---|---|---|
| JP | 2008-1291 A | 1/2008 | |
| JP | EP 1916167 A2 * | 4/2008 | ............ B60T 8/4081 |
| JP | 2008-230355 A | 10/2008 | |
| JP | 2010-269772 A | 12/2010 | |
| JP | 2010-280383 A | 12/2010 | |

* cited by examiner

FIG.14

| ABNORMALITY POINT | CONTROL MODE | WARNING |
|---|---|---|
| PRESSURE-REGULATING SYSTEM PRESSURE-BUILDUP ABNORMALITY | PRESSURE-BUILDUP ABNORMALITY FLUID PRESSURE CONTROL | OPERATION |
| PRESSURE-REGULATING VALVE ABNORMALITY | PRESSURE-REDUCTION ABNORMALITY FLUID PRESSURE CONTROL | OPERATION |
| COMMUNICATING VALVE ABNORMALITY | BOOSTER FLUID PRESSURE CONTROL | OPERATION |

BRAKE DEVICE

TECHNICAL FIELD

The present invention relates to a brake device.

BACKGROUND ART

This type of technique has been disclosed in the following Patent Document 1. The published patent application discloses a technique that an amount of depression of a brake pedal operated by a driver is detected and a wheel cylinder pressure is multiplied with respect to a master cylinder pressure by building up the wheel cylinder pressure by a pump depending on the depression amount.

CITATION LIST

Patent Literature

Patent document 1: Japanese patent provisional publication No. 2006-306272 (A)

SUMMARY OF INVENTION

Technical Problem

For the purpose of checking for a booster-control disabling state where booster control cannot be executed owing to a failure in each of components, by which the booster control is performed, a pump has to be driven. However, in the technique disclosed in the aforementioned Patent document 1, a wheel-cylinder pressure buildup occurs by driving the pump during vehicle running and hence the vehicle tends to decelerate. Accordingly, a check for the previously-discussed booster-control disabling state cannot be executed during vehicle running and thus there is a possibility that the booster-control disabling state may be undesirably prolonged because of a failure remaining undetected.

It is, therefore, in view of the previously-described drawbacks of the prior art, an object of the invention to provide a brake device capable of detecting a failure in each of components, by which booster control is performed, at an early stage even during vehicle running.

Solution to Problem

In order to accomplish the foregoing object, according to the present invention, brake fluid is discharged by a pump into a communicating fluid path that connects a fluid path of a primary system and a fluid path of a secondary system, a first communicating valve for restricting a flow of brake fluid from the communicating fluid path to the fluid path of the primary system and a second communicating valve for restricting a flow of brake fluid from the communicating fluid path to the fluid path of the secondary system are controlled in respective valve-closing directions, and at least a state of the pump is checked.

Advantageous Effects of Invention

Therefore, in the brake device of the invention, it is possible to detect a failure in each of components, by which booster control is preformed, even during vehicle running.

BRIEF DESCRIPTION OF DRAWINGS

FIG. 14 is a diagram illustrating a control-mode table for control modes suitable for respective abnormality points.

DESCRIPTION OF EMBODIMENTS

First Embodiment

[General System Configuration of Brake Device]

Figure 1:
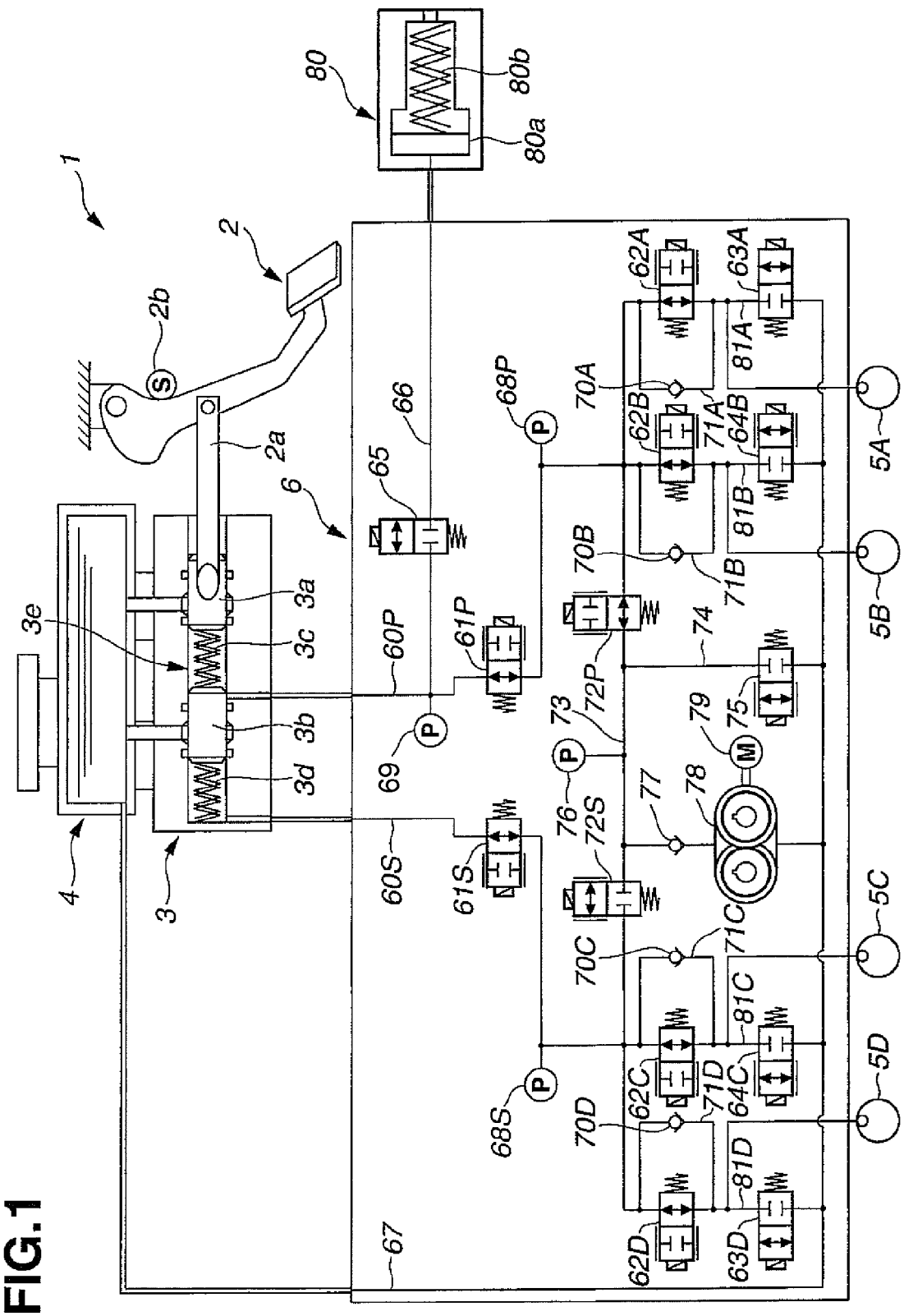
FIG. 1 is a diagram illustrating the general system configuration of a brake device of a first embodiment.

A brake device 1 of the first embodiment is hereunder described. FIG. 1 is the general system configuration of brake device 1.

Brake device 1 has a brake pedal 2 depressed by a driver, a master cylinder 3 in which fluid pressure is developed and produced by depression of the brake pedal 2, a reservoir tank 4 for storing brake fluid, wheel cylinders 5A, 5B, 5C, 5D provided for each individual road wheel for producing a braking force by the brake fluid pressure, and a brake fluid pressure control unit 6 configured to control the brake fluid pressure supplied to the wheel cylinder 5. The symbols "A", "B", "C", and "D" of wheel cylinders 5A, 5B, 5C, and 5D are included and indicated for discriminating that these wheel cylinders are provided for respective road wheels. In the following description, in the case that there is no necessity of discrimination in other system configurations, indication of these symbols "A", "B", "C", and "D" will be omitted.

A pushrod 2a is linked to the brake pedal 2. The pushrod 2a is also linked to a primary piston 3a of master cylinder 3. A stroke sensor 2b is attached to the brake pedal 2 for detecting an amount of depression of brake pedal 2.

A cylinder 3e is formed in the master cylinder 3 such that the primary piston 3a and a secondary piston 3b are slidable in the cylinder 3e. Cylinder 3e is partitioned into a primary fluid-pressure chamber 3c and a secondary fluid-pressure chamber 3d by the secondary piston 3b. The pressure of brake fluid in the primary fluid-pressure chamber 3c is built up by the primary piston 3a, whereas the pressure of brake fluid in the secondary fluid-pressure chamber 3d is built up by the secondary piston 3b. Brake fluid is supplied from the reservoir tank 4 into each of the primary fluid-pressure chamber 3c and the secondary fluid-pressure chamber 3d.

[Configuration of Brake Fluid Pressure Control Unit]

The configuration of brake fluid pressure control unit 6 is hereunder described. Formed in the brake fluid pressure control unit 6 are a primary fluid path 60P through which the primary fluid-pressure chamber 3c and each of wheel cylinders 5A, 5B are connected to each other, and a secondary fluid path 60S through which the secondary fluid-pressure chamber 3d and each of wheel cylinders 5C, 5D are connected to each other. The symbol "P" of the primary fluid path 60P indicates elements arranged on the side of the primary system, whereas the symbol "S" of the secondary fluid path 60S indicates elements arranged on the side of the secondary system. In the following description, in the case that there is no necessity of discrimination in other system configurations, indication of these symbols "P" and "S" will be omitted. The layout of the hydraulic system concerning connection of wheel cylinder 5, may be applied to a so-called X-split diagonal layout in which wheel cylinders 5A, 5B are respectively used for a front-left (FL) road wheel and a rear-right (RR) road wheel, whereas wheel cylinders 5C, 5D are respectively used for a front-right (FR) road wheel and a rear-left (RL) road wheel. In lieu thereof, the layout of the hydraulic system concerning wheel-cylinder connection may be applied to a so-called H-split parallel layout in which wheel cylinders 5A, 5B are respectively used for a front-left (FL) road wheel and a rear-left (RL) road wheel, whereas wheel cylinders 5C, 5D are respectively used for a front-right (FR) road wheel and a rear-right (RR) road wheel.

A shutoff valve 61P, which is a normally-open proportional valve, is disposed in the primary fluid path 60P, whereas a shutoff valve 61S, which is a normally-open proportional valve, is disposed in the secondary fluid path 60S. The shutoff valve 61P may be constructed by an ON/OFF valve. Also, the shutoff valve 61S may be constructed by an ON/OFF valve. But, during normal control, this shutoff valve is always controlled to a valve-closed state. Thus, it is preferable that the shutoff valve 61P and shutoff valve 61S are configured to be operated by electric-current control based on pulse-width modulation (PWM) control. A master-cylinder pressure sensor 69 is disposed in the primary fluid path 60P and located between the primary fluid-pressure chamber 3c and the shutoff valve 61P, for detecting the fluid pressure in the primary fluid-pressure chamber 3c.

Also provided is a stroke simulator fluid path 66 configured to be branched from a branch point of the primary fluid path 60P between the primary fluid-pressure chamber 3c and the shutoff valve 61P. Stroke simulator fluid path 66 is connected to a stroke simulator 80. A stroke-simulator shutoff valve 65, which is a normally-closed ON/OFF valve, is disposed in the stroke simulator fluid path 66 and located between the primary fluid path 60P and the stroke simulator 80. Stroke simulator 80 is comprised of a piston 80a and a spring 80b. When stroke-simulator shutoff valve 65 is kept open, piston 80a is displaced depending on the fluid pressure produced or developed in the primary fluid-pressure chamber 3c of master cylinder 3, and a reaction force of spring 80b results from the displacement of piston 80a, thus permitting a pedal reaction to be exerted on the brake pedal 2.

Pressure buildup valves 62A, 62B, which are normally-open proportional valves, are disposed in the primary fluid path 60P and arranged on the side of each wheel cylinder 5 associated with the primary fluid path. Pressure buildup valves 62C, 62D, which are normally-open proportional valves, are disposed in the secondary fluid path 60S and arranged on the side of each wheel cylinder 5 associated with the secondary fluid path. Also provided are bypass fluid paths 71A, 71B, 71C, 71D configured to bypass respective pressure buildup valves 62. One-way valves 70A, 70B, 70C, 70D are disposed in respective bypass fluid paths 71. One-way valve 70 restricts a flow of brake fluid flowing from the side of master cylinder 3 to the side of wheel cylinder 5, and permits a flow of brake fluid from the side of wheel cylinder 5 to the side of master cylinder 3.

A primary-fluid-path fluid pressure sensor 68P is disposed in the primary fluid path 60P and located between the shutoff valve 61P and the pressure buildup valves 62A, 62B, for detecting the fluid pressure (hereinafter referred to as "primary-fluid-path fluid pressure") in the fluid path between them. A secondary-fluid-path fluid pressure sensor 68S is disposed in the secondary fluid path 60S and located between the shutoff valve 61S and the pressure buildup valves 62C, 62D, for detecting the fluid pressure (hereinafter referred to as "secondary-fluid-path fluid pressure") in the fluid path between them.

Also provided is a communicating fluid path 73 configured to connect a joining point of the primary fluid path 60P between the primary-fluid-path fluid pressure sensor 68P and the pressure buildup valves 62A, 62B and a joining point of the secondary fluid path 60S between the secondary-fluid-path fluid pressure sensor 68S and the pressure buildup valves 62C, 62D. A communicating valve 72P, which is a normally-open proportional valve, is disposed in the communicating fluid path 73 and arranged on the side of the primary fluid path 60P. A communicating valve 72S, which is a normally-closed proportional valve, is disposed in the communicating fluid path 73 and arranged on the side of the secondary fluid path 60S. A communicating-fluid-path fluid pressure sensor 76 is disposed in the communicating fluid path 73 for detecting the fluid pressure in the communicating fluid path 73.

As discussed above, communicating valve 72P is constructed by a normally-open type, whereas communicating valve 72S is constructed by a normally-closed type. This enables fluid-communication between the primary fluid path 60P and the secondary fluid path 60S to be blocked, even in the presence of an electric power source failure. At least one of communicating valve 72P and communicating valve 72S should be constructed by a normally-closed type. The communicating valve 72P and the communicating valve 72S may be constructed by a normally-closed type.

As discussed previously, communicating valve 72P and communicating valve 72S are proportional valves. The normally-open communicating valve 72P may be constructed by an ON/OFF valve. Also, the normally-closed communicating valve 72S may be constructed by an ON/OFF valve, but, during normal control, this communicating valve is always controlled to a valve-open state. Thus, it is preferable that the communicating valve 72S is configured to be operated by electric-current control based on pulse-width modulation (PWM) control.

The discharge side (discharge port) of a pump 78 is connected via a discharge valve 77 to the communicating fluid path 73. Pump 78 is driven by a motor 79. Discharge valve 77 permits a flow of brake fluid in one direction such that brake fluid is discharged from the pump 78 toward the communicating fluid path 73, and restricts a flow of brake fluid in the opposite direction. The suction side (suction port) of pump 78 is connected to a suction fluid path 67, which is connected to the reservoir tank 4. Also provided is a reflux (back-flow) fluid path 74 configured between the communicating fluid path 73 and the suction fluid path 67. A pressure-regulating valve 75, which is a normally-closed proportional valve, is disposed in the reflux fluid path 74. The pressure-regulating valve 75 may be constructed by a normally-open type. But, if the pressure-regulating valve 75 is constructed by a normally-open type, the communicating valve 72P and the communicating valve 72S should be constructed by a normally-closed type.

A pressure reduction fluid path 81A is branched from a branch point of the primary fluid path 60P between the wheel cylinder 5A and the pressure buildup valve 62A, whereas a pressure reduction fluid path 81B is branched from a branch point of the primary fluid path between the wheel cylinder 5B and the pressure buildup valve 62B. In a similar manner, a pressure reduction fluid path 81C is branched from a branch point of the secondary fluid path 60S between the wheel cylinder 5C and the pressure buildup valve 62C, whereas a pressure reduction fluid path 81D is branched from a branch point of the secondary fluid path between the wheel cylinder 5D and the pressure buildup valve 62D. Each individual pressure reduction fluid path 81 is connected to the suction fluid path 67.

Pressure reduction valves 63A, 63D, which are normally-closed ON/OFF valves, are disposed in respective pressure reduction fluid paths 81A, 81D. Back-up pressure reduction valves 64B, 64C, which are normally-closed proportional valves, are disposed in respective pressure reduction fluid paths 81B, 81C. As discussed above, back-up pressure reduction valves 64B, 64C are constructed by proportional valves. This is because, when pressure-regulating valve 75 has failed, back-up pressure reduction valves 64B, 64C are used instead of the pressure-regulating valve 75. By the way, pressure reduction valves 63A, 63D may be constructed by proportional valves such that these valves should be used instead of the pressure-regulating valve 75.

[Configuration of Controller]

Figure 2:
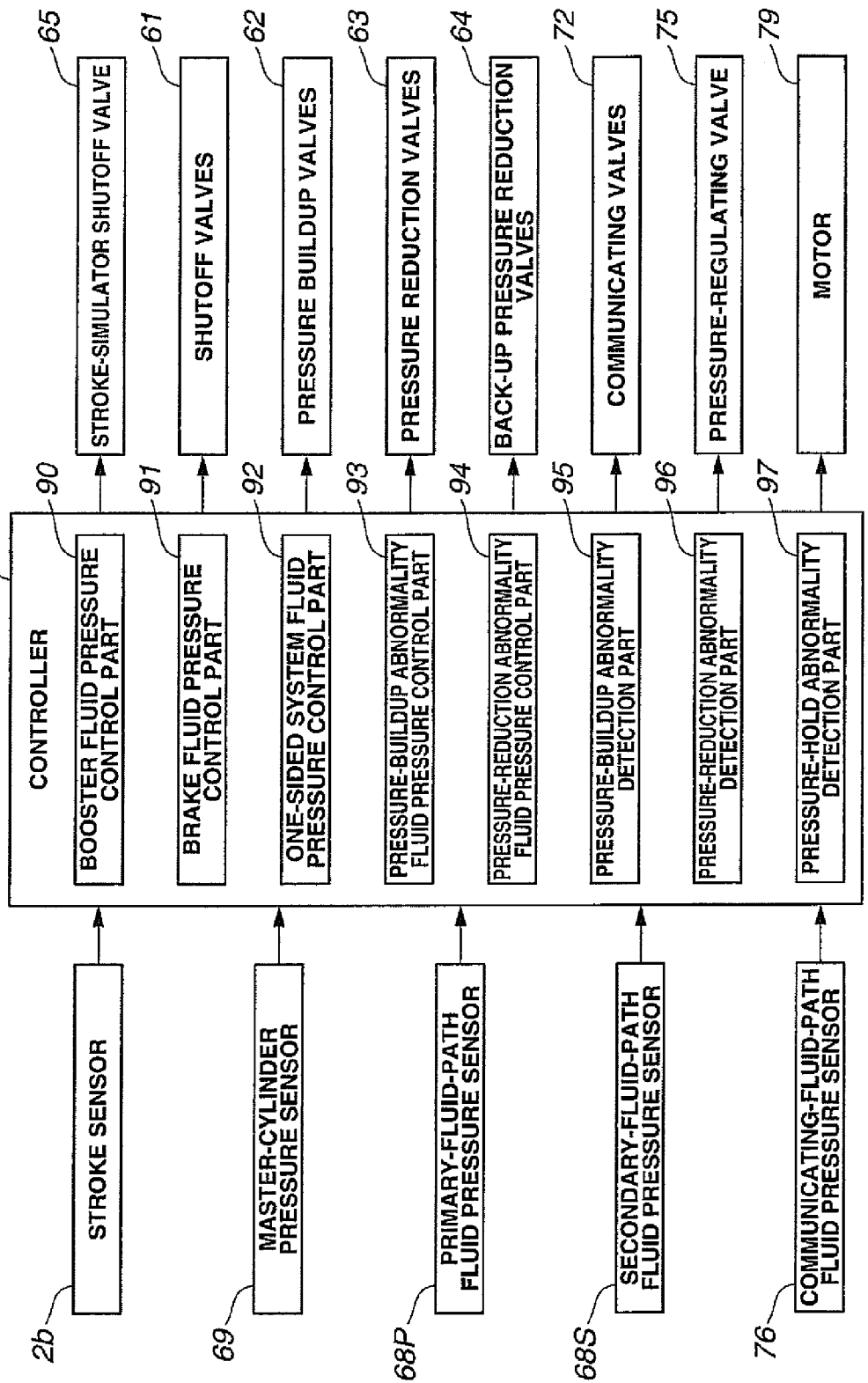
FIG. 2 is a block diagram illustrating the configuration of a controller in the first embodiment.

Referring to FIG. 2, there is shown the diagram illustrating the configuration of a controller 9. Controller 9 has a booster fluid pressure control part 90, an automatic brake fluid pressure control part 91, a one-sided system fluid pressure control part 92, a pressure-buildup abnormality fluid pressure control part 93, a pressure-reduction abnormality fluid pressure control part 94, a pressure-buildup abnormality detection part 95, a pressure-reduction abnormality detection part 96, and a pressure-hold abnormality detection part 97. Controller 9 receives input information from the stroke sensor 2b, the master-cylinder pressure sensor 69, the primary-fluid-path fluid pressure sensor 68P, the secondary-fluid-path fluid pressure sensor 68S, and the communicating-fluid-path fluid pressure sensor 76. The controller controls, based on the results of operations executed within respective control parts 90-97, stroke-simulator shutoff valve 65, shutoff valves 61, pressure buildup valves 62, pressure reduction valves 63, back-up pressure reduction valves 64, communicating valves 72, pressure-regulating valve 75, and motor 79. By the way, pressure-buildup abnormality detection part 95, pressure-reduction abnormality detection part 96, and pressure-hold abnormality detection part 97 construct a pump-state check part.

(Booster Fluid Pressure Control)

Figure 3:
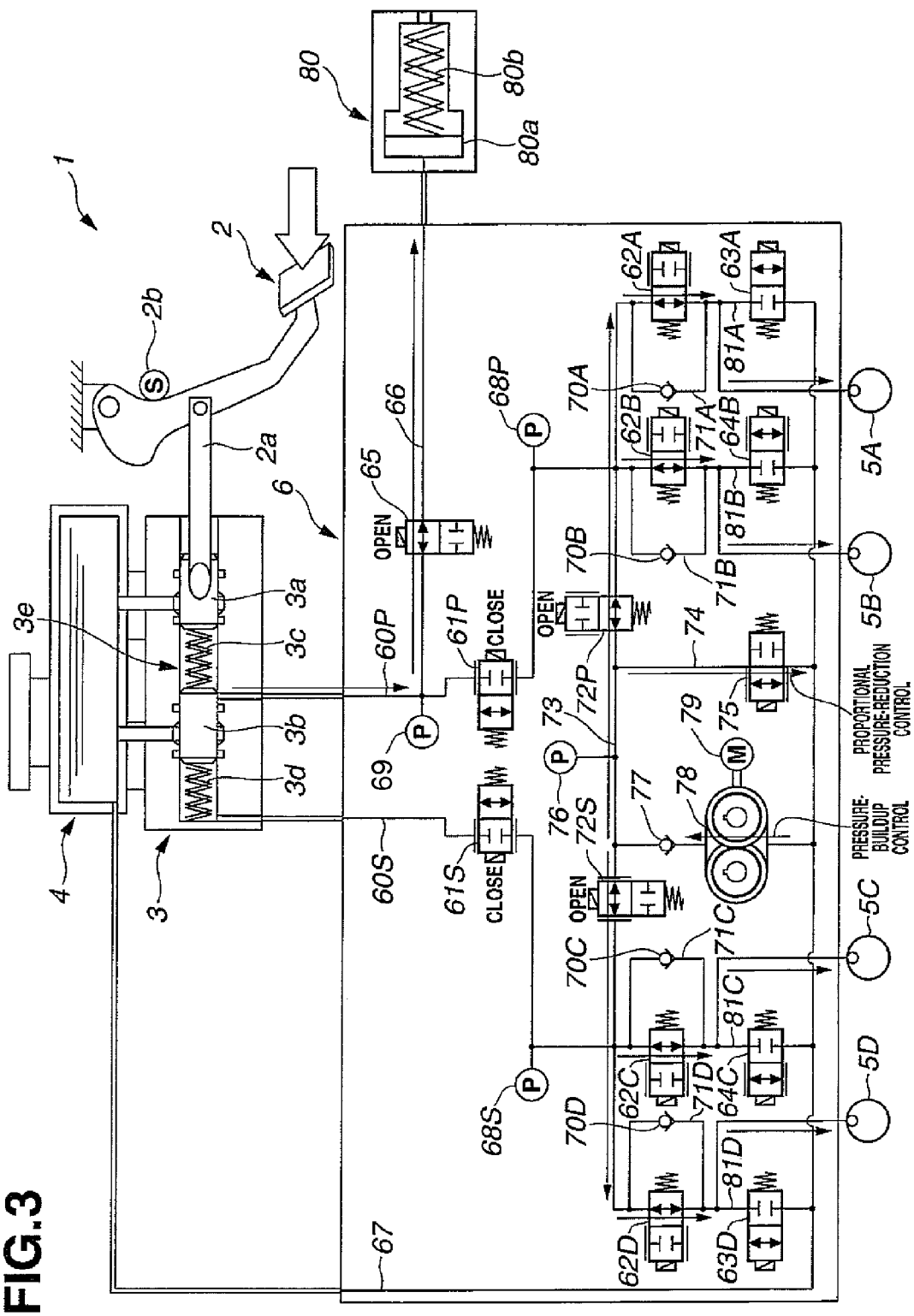
FIG. 3 is a diagram illustrating a control action of brake fluid pressure control under a normal condition in the first embodiment.

Referring to FIG. 3, there is shown the control of brake fluid pressure control unit 6 executed by means of the booster fluid pressure control part 90 under a normal condition. As shown in FIG. 3, normally, shutoff valves 61 are kept closed, while stroke-simulator shutoff valve 65 is kept open. Hence, when brake pedal 2 is depressed by the driver, brake fluid, which is sent from the master cylinder 3 into the brake fluid pressure control unit 6, is delivered into the stroke simulator 80. At this time, stroke simulator 80 produces a brake-pedal reaction whose magnitude is dependent on the amount of depression of brake pedal 2.

Additionally, during the booster fluid pressure control, communicating valves 72 are kept open. In this manner, shutoff valves 61 are kept closed, while the communicating valves 72 are kept open, and thus the fluid pressure, detected by the communicating-fluid-path fluid pressure sensor 76, can be regarded as a wheel cylinder pressure. During the booster fluid pressure control, an operation amount of brake pedal 2 by the driver is detected by the stroke sensor 2b, and then a target wheel cylinder pressure is calculated based on the detected operation amount. Motor 79 is controlled by pulse-width modulation (PWM) control depending on a deviation between the target wheel cylinder pressure and the detected wheel cylinder pressure. Also, pressure-regulating valve 75 is controlled by PWM control depending on a deviation between the target wheel cylinder pressure and the detected wheel cylinder pressure. That is, the wheel cylinder pressure is regulated by means of both the motor 79 and the pressure-regulating valve 75. Accordingly, this enables booster control in which, when brake pedal 2 is depressed, a wheel cylinder fluid pressure is multiplied depending on the depression amount.

Furthermore, the brake device 1 of the first embodiment also serves as a brake-by-wire brake device with the shutoff valves 61 closed. In vehicles that use a motor generator as a driving power source, during regenerative braking, it is possible to execute regenerative cooperation control in which the wheel cylinder pressure (the fluid-pressure braking force) is decreased by the magnitude of regenerative braking force.

Moreover, booster fluid pressure control may be executed only when a predetermined condition, for example, an excessive deviation between the target wheel cylinder pressure and the detected wheel cylinder pressure, has been satisfied. In contrast when the predetermined condition is unsatisfied, the fluid pressure control system may be configured such that shutoff valves 61 are kept open, and communicating valves 72 and stroke-simulator shutoff valve 65 are kept closed, for pressurizing each individual wheel cylinder 5 by brake fluid sent or forced from the master cylinder 3 to the wheel cylinders, thereby producing a braking force. In this case, it is possible to suppress an operation frequency of the pump.

(Automatic Brake Fluid Pressure Control)

An automatic brake fluid pressure control means a control action, in which, even when brake pedal 2 is not depressed, brake fluid is automatically supplied into wheel cylinders 5 for producing a braking force during sideslip prevention control by which a vehicle sideslip is prevented during vehicle turning or during traction control by which required braking for a slipping (skidding) drive wheel is regulated in the case that a slip (a skid) of each drive wheel occurs when accelerating. In a similar to the booster fluid pressure control, during automatic brake fluid pressure control, shutoff valves 61 are kept closed, while stroke-simulator shutoff valve 65 is kept open by means of automatic brake fluid pressure control part 91. By the way, during automatic brake fluid pressure control, the stroke-simulator shutoff valve 65 may be kept closed.

Additionally, communicating valves 72 are kept open and motor 79 is driven for feeding brake fluid into the communicating fluid path 73 via the pump 78. Simultaneously, the amount of valve opening of pressure-regulating valve 75 is adjusted by proportional control for adjusting the amount of brake fluid to be supplied from the communicating fluid path 73 into the primary fluid path 60P and the secondary fluid path 60S.

Furthermore, to independently control the fluid pressure to each individual wheel cylinder 5, pressure buildup valves 62, pressure reduction valves 63, and back-up pressure reduction valves 64 are controlled.

(One-Sided System Fluid Pressure Control)

Figure 4:
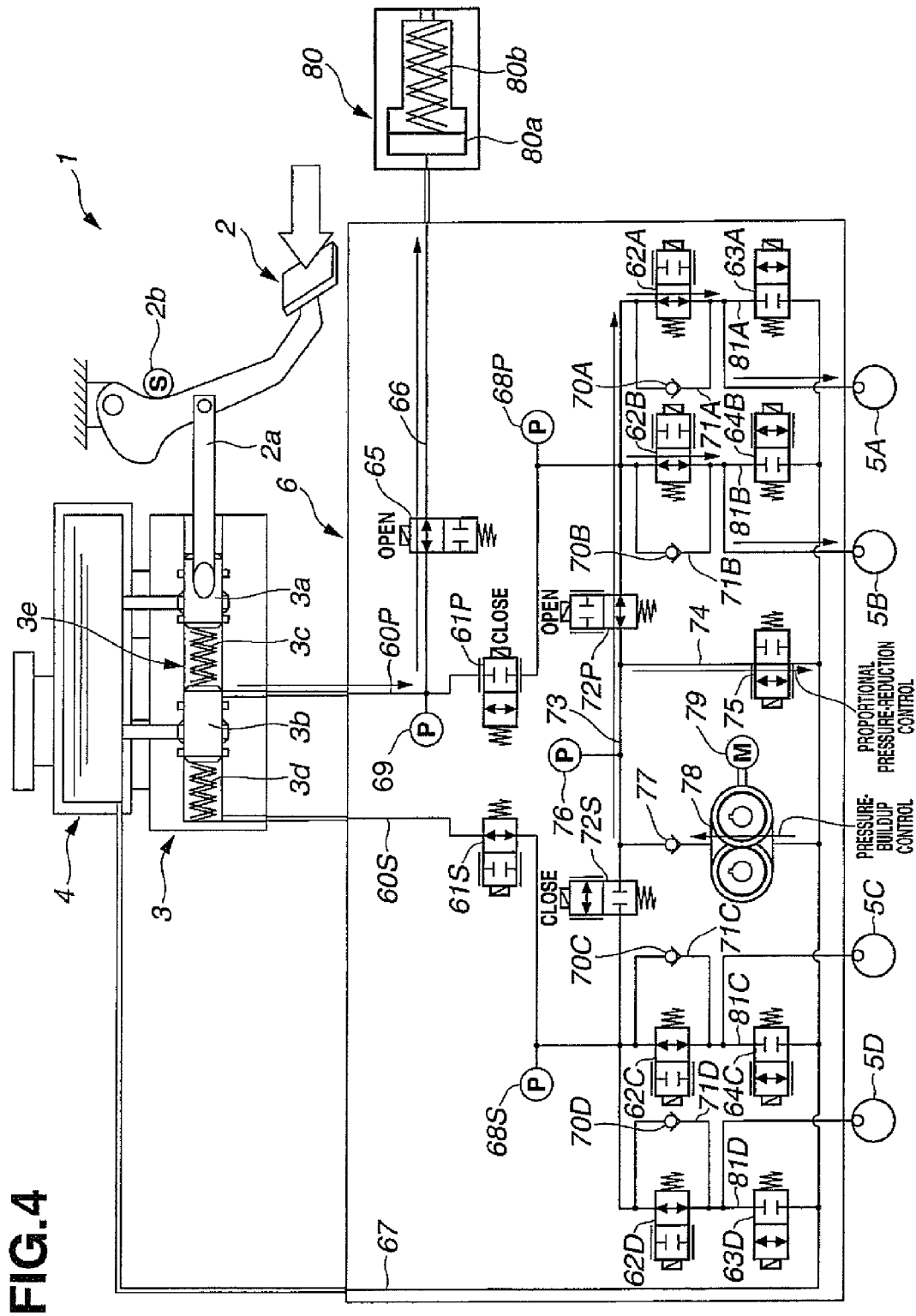
FIG. 4 is a diagram illustrating a control action of brake fluid pressure control in the presence of a one-sided system failure in the first embodiment.

Referring to FIG. 4, there is shown the control of brake fluid pressure control unit 6 executed by means of the one-sided system fluid pressure control part 92 in the presence of a one-sided system failure. The aforementioned one-sided system failure means a state where a failure in the fluid-pressure circuit of either the primary system or the secondary system occurs, thereby causing a leakage of fluid pressure (brake fluid). FIG. 4 shows a situation in which a failure in the fluid-pressure circuit of the secondary system is occurring.

As shown in FIG. 4, when a failure in the fluid-pressure circuit of the secondary system is occurring, shutoff valve 61P is kept closed, shutoff valve 61S is kept open, and stroke-simulator shutoff valve 65 is kept open. Hence, when brake pedal 2 is depressed by the driver, brake fluid, which is sent from the master cylinder 3 into the brake fluid pressure control unit 6, is delivered into the stroke simulator 80. At this time, stroke simulator 80 produces a brake-pedal reaction whose magnitude is dependent on the amount of depression of brake pedal 2. At this time, shutoff valve 61S may be kept closed. By the way, in the presence of a failure in the brake-pressure circuit of the primary system, shutoff valve 61P and shutoff valve 61S are both kept closed.

Additionally, in the presence of a failure in the fluid-pressure circuit of the secondary system, the communicating valve 72S of the failed side is kept closed, the other communicating valve 72P is kept open, and motor 79 is driven for feeding brake fluid into the communicating fluid path 73 via the pump 78. Simultaneously, the amount of valve opening of pressure-regulating valve 75 is adjusted by proportional control for adjusting the amount of brake fluid to be supplied from the communicating fluid path 73 into the primary fluid path 60P. Accordingly, even in the presence of a failure in the fluid-pressure circuit of the secondary system, it is possible to fulfil booster control by the fluid-pressure circuit side of the primary system.

(Pressure-Buildup Abnormality Fluid Pressure Control)

Figure 5:
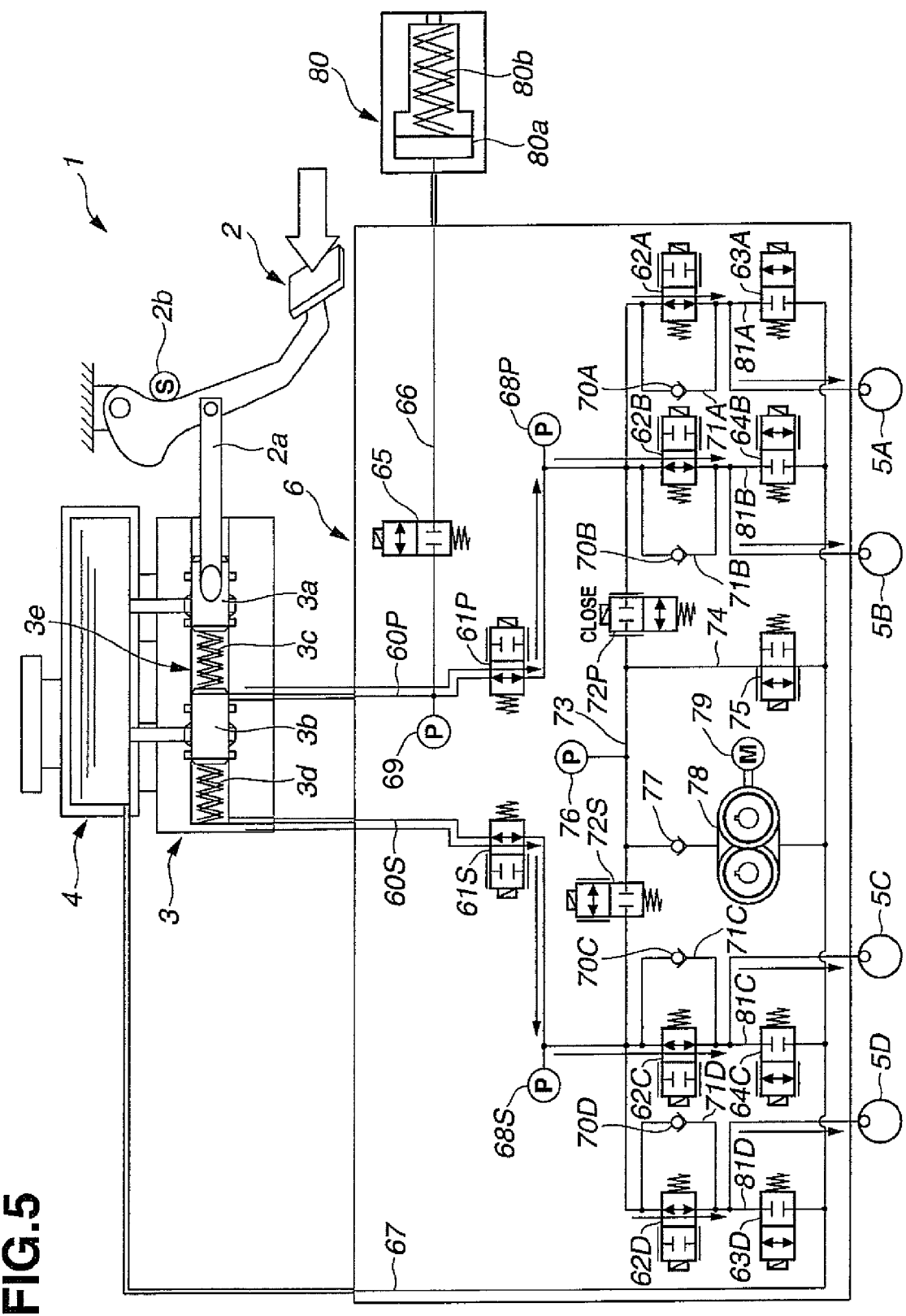
FIG. 5 is a diagram illustrating a control action of brake fluid pressure control in the presence of a pressure-regulating system pressure-buildup abnormality in the first embodiment.

Referring to FIG. 5, there is shown the control of brake fluid pressure control unit 6 executed by means of the pressure-buildup abnormality fluid pressure control part 93 in the presence of a pressure-regulating system pressure-buildup abnormality. The pressure-regulating system corresponds to components provided for adjusting the amount of brake fluid from the pump 78 through the communicating fluid path 73 into the primary fluid path 60P and the secondary fluid path 60S. Concretely, the pressure-regulating system means the pressure-regulating valve 75, the pump 78, and the motor 79. Also, the aforementioned pressure-regulating system pressure-buildup abnormality means a state where brake fluid cannot be supplied into the communicating fluid path 73, for example, due to a failure in the motor 79 or a failure in the pump 78 or a state where brake fluid cannot be supplied into the primary fluid path 60P and the secondary fluid path 60S, for example, due to the pressure-regulating valve 75 stuck in its valve-open state.

As shown in FIG. 5, when a pressure-buildup abnormality is occurring, shutoff valves 61 are kept open, stroke-simulator shutoff valve 65 is kept closed, and communicating valve 72 is kept closed. Hence, when brake pedal 2 is depressed by the driver, brake fluid, which is sent from the master cylinder 3 into the brake fluid pressure control unit 6, is not delivered into the stroke simulator 80, but supplied into the side of wheel cylinder 5. That is, in the presence of a pressure-buildup abnormality, brake fluid is supplied into the wheel cylinder 5 under master cylinder pressure. Thus, any multiplying action cannot be produced, but a minimum braking force can be ensured.

(Pressure-Reduction Abnormality Fluid Pressure Control)

Figure 6:
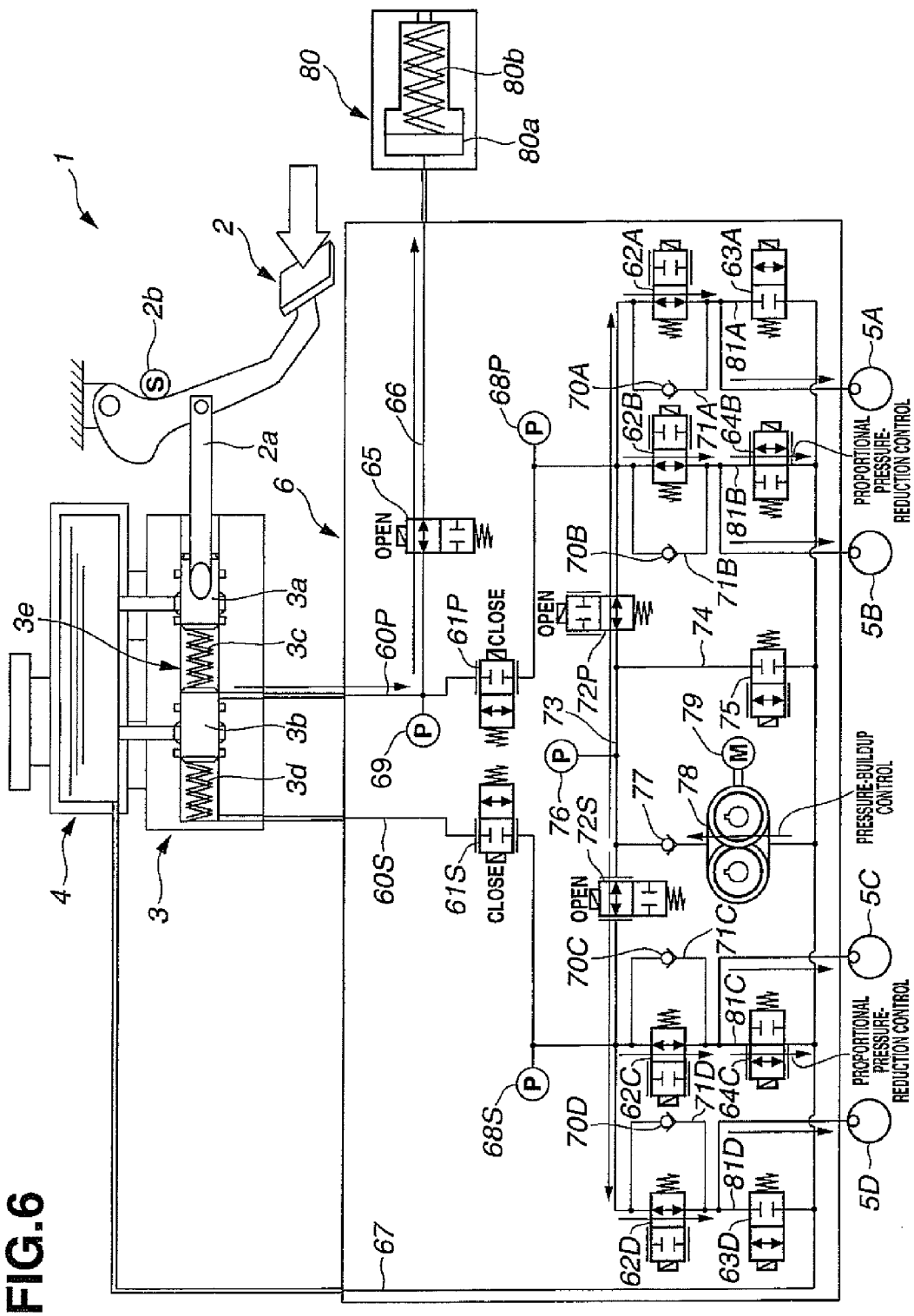
FIG. 6 is a diagram illustrating a control action of brake fluid pressure control in the presence of a pressure-reduction abnormality in the first embodiment.

Referring to FIG. 6, there is shown the control of brake fluid pressure control unit 6 executed by means of the pressure-reduction abnormality fluid pressure control part 94 in the presence of a pressure-reduction abnormality. The aforementioned pressure-reduction abnormality means a state where, for example, due to a failure in the pressure-regulating valve 75, that is, due to the sticking pressure-regulating valve, which cannot be controlled to its valve-open state, the amount of brake fluid to be supplied from the communicating fluid path 73 into the primary fluid path 60P and the secondary fluid path 60S cannot be controlled.

As shown in FIG. 6, when a pressure-reduction abnormality is occurring, shutoff valves 61 are kept closed, while stroke-simulator shutoff valve 65 is kept open. Hence, when brake pedal 2 is depressed by the driver, brake fluid, which is sent from the master cylinder 3 into the brake fluid pressure control unit 6, is delivered into the stroke simulator 80. At this time, stroke simulator 80 produces a brake-pedal reaction whose magnitude is dependent on the amount of depression of brake pedal 2.

Additionally, in the presence of a pressure-reduction abnormality, communicating valves 72 are kept open, and motor 79 is driven for feeding brake fluid into the communicating fluid path 73 via the pump 78. Simultaneously, the amount of valve opening of each of back-up pressure reduction valves 64 is adjusted by proportional control for adjusting the amount of brake fluid to be supplied from the primary fluid path 60P and the secondary fluid path 60S into the respective wheel cylinders 5. Accordingly, this enables booster control in which, when brake pedal 2 is depressed, a wheel cylinder fluid pressure is multiplied depending on the depression amount. That is, instead of the failed pressure-regulating valve 75, the back-up pressure-reduction valves 64 are used.

(Electric Power Source Failure Fluid Pressure Control)

Figure 7:
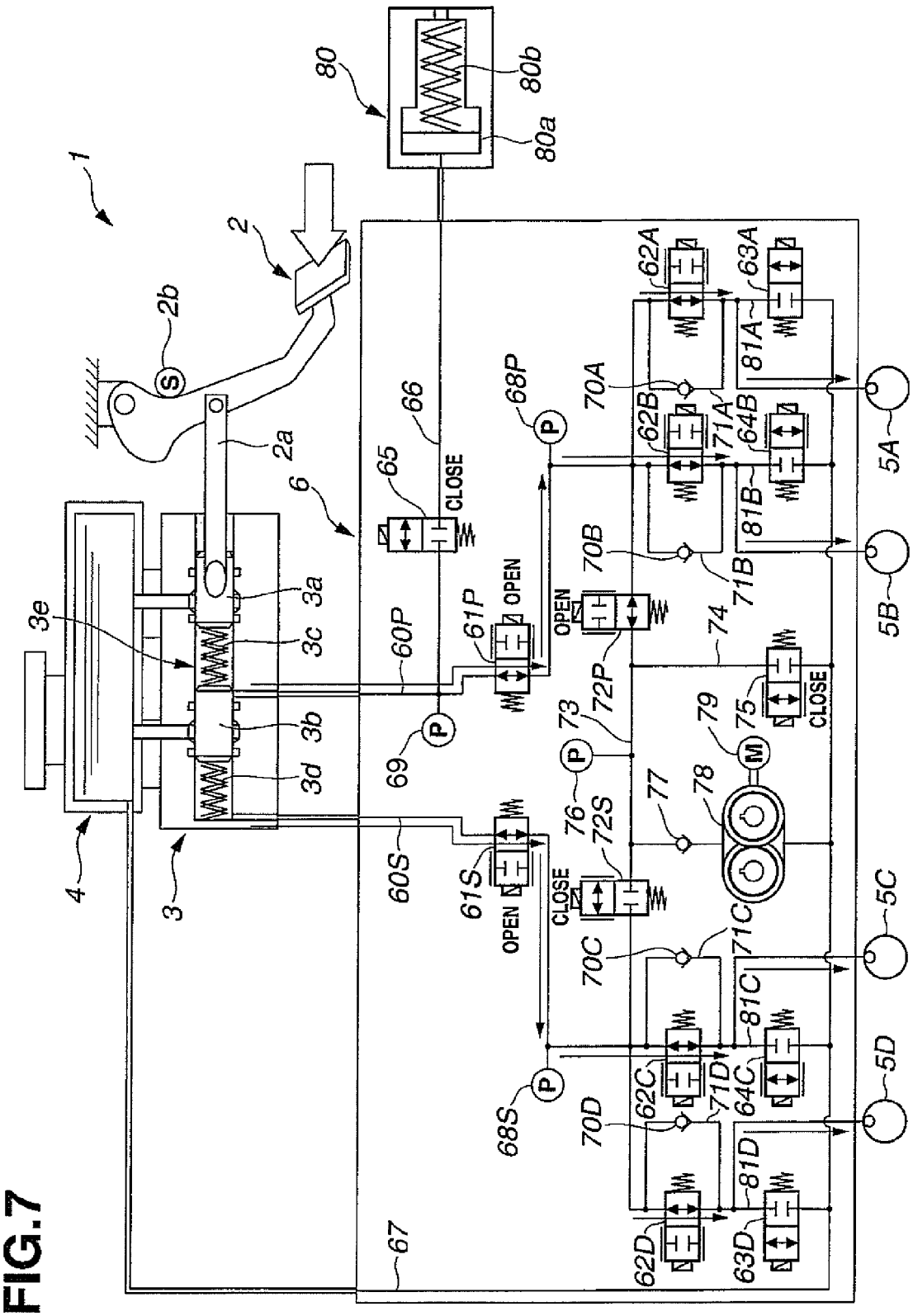
FIG. 7 is a diagram illustrating a control action of brake fluid pressure control in the presence of an electric power source failure in the first embodiment.

Referring to FIG. 7, there is shown the control of brake fluid pressure control unit 6 executed in the presence of an electric power source failure. In the presence of an electric power source failure, it is impossible to energize each of the valves of brake fluid pressure control unit 6. For this reason, as shown in FIG. 7, in the presence of an electric power source failure, shutoff valves 61 are kept open, while stroke-simulator shutoff valve 65 is kept closed. Additionally, the communicating valve 72P on the side of the primary fluid path 60P is kept open, the communicating valve 72S on the side of the secondary fluid path 60S is kept closed, the pressure-regulating valve 75 is kept closed, and the motor 79 is stopped.

Hence, when brake pedal 2 is depressed by the driver, brake fluid, which is sent from the master cylinder 3 into the brake fluid pressure control unit 6, is not delivered into the stroke simulator 80, but supplied into the side of wheel cylinder 5. Also, fluid-communication between the primary fluid path 60P and the secondary fluid path 60S is blocked, since the communicating valve 72S on the side of the secondary fluid path 60S is kept closed.

(Pressure-Buildup Abnormality Detection Processing)

Figure 8:
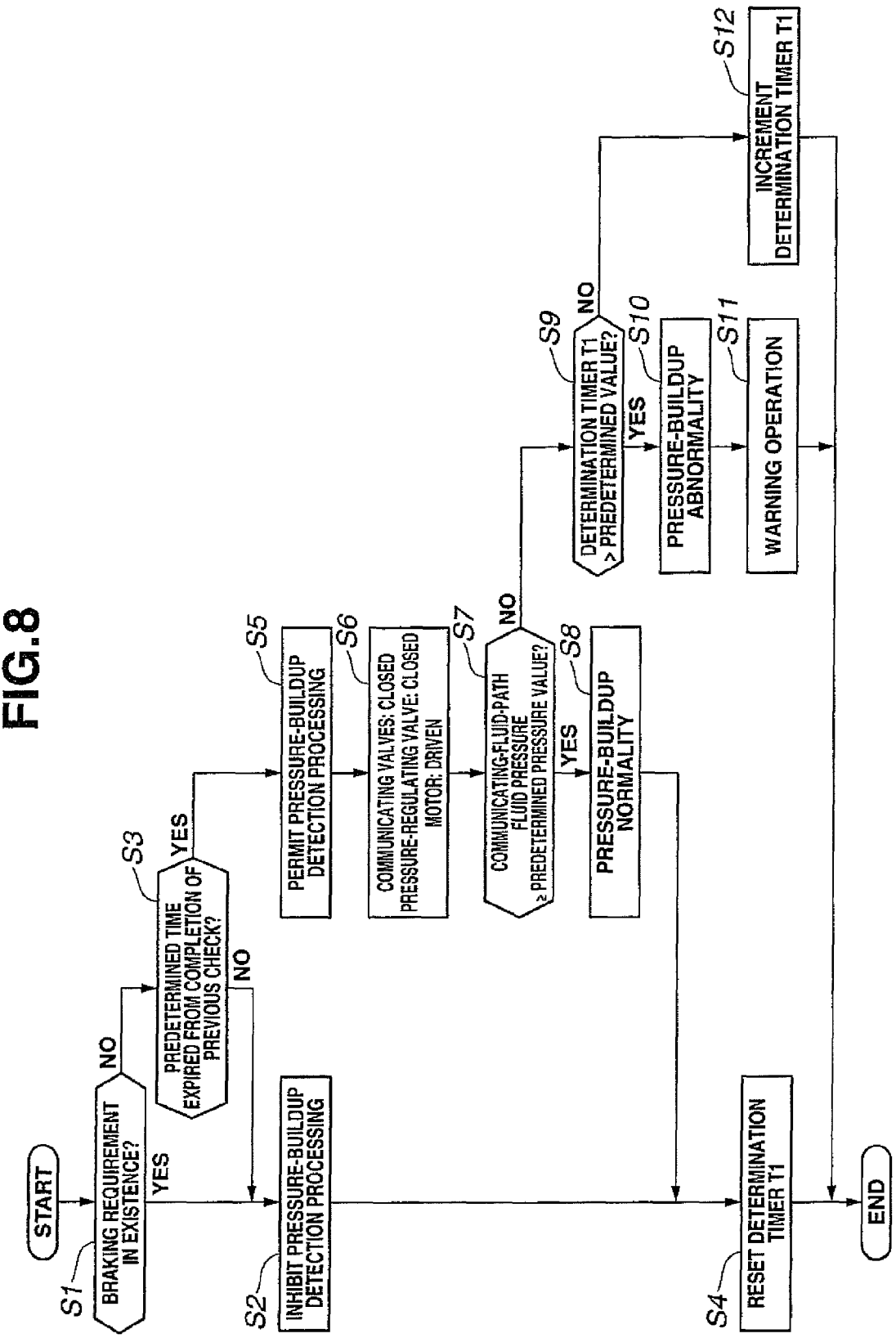
FIG. 8 is a flowchart illustrating a control flow for detecting a pressure-buildup abnormality in the first embodiment.

Referring to FIG. 8, there is shown the flowchart illustrating the control flow executed within the pressure-buildup abnormality detection part 95 for detecting a pressure-buildup abnormality.

At step S1, a check is made to determine whether a braking requirement is present or absent. In the presence of a braking requirement, the routine proceeds to step S2. Conversely in the absence of a braking requirement, the routine proceeds to step S3. In determining the presence or absence of a braking requirement, for instance, when the detected value of stroke sensor 2b becomes greater than or equal to a predetermined value and thus depressing operation of the brake pedal 2 by the driver is detected, the presence of a braking requirement can be determined. Also, when automatic brake fluid pressure control is required for carrying out sideslip control or traction control, the presence of a braking requirement can be determined.

At step S2, pressure-buildup abnormality detection processing is inhibited and then the routine proceeds to step S4.

At step S3, a check is made to determine whether a predetermined time has expired from completion of the previous pressure-buildup abnormality detection processing. When the predetermined time has expired, the routine proceeds to step S5. Conversely when the predetermined time has not yet expired, the routine proceeds to step S2.

At step S4, a determination timer T1 is reset, and then the current processing terminates.

At step S5, execution of pressure-buildup abnormality detection processing is permitted and then the routine proceeds to step S6.

Figure 9:
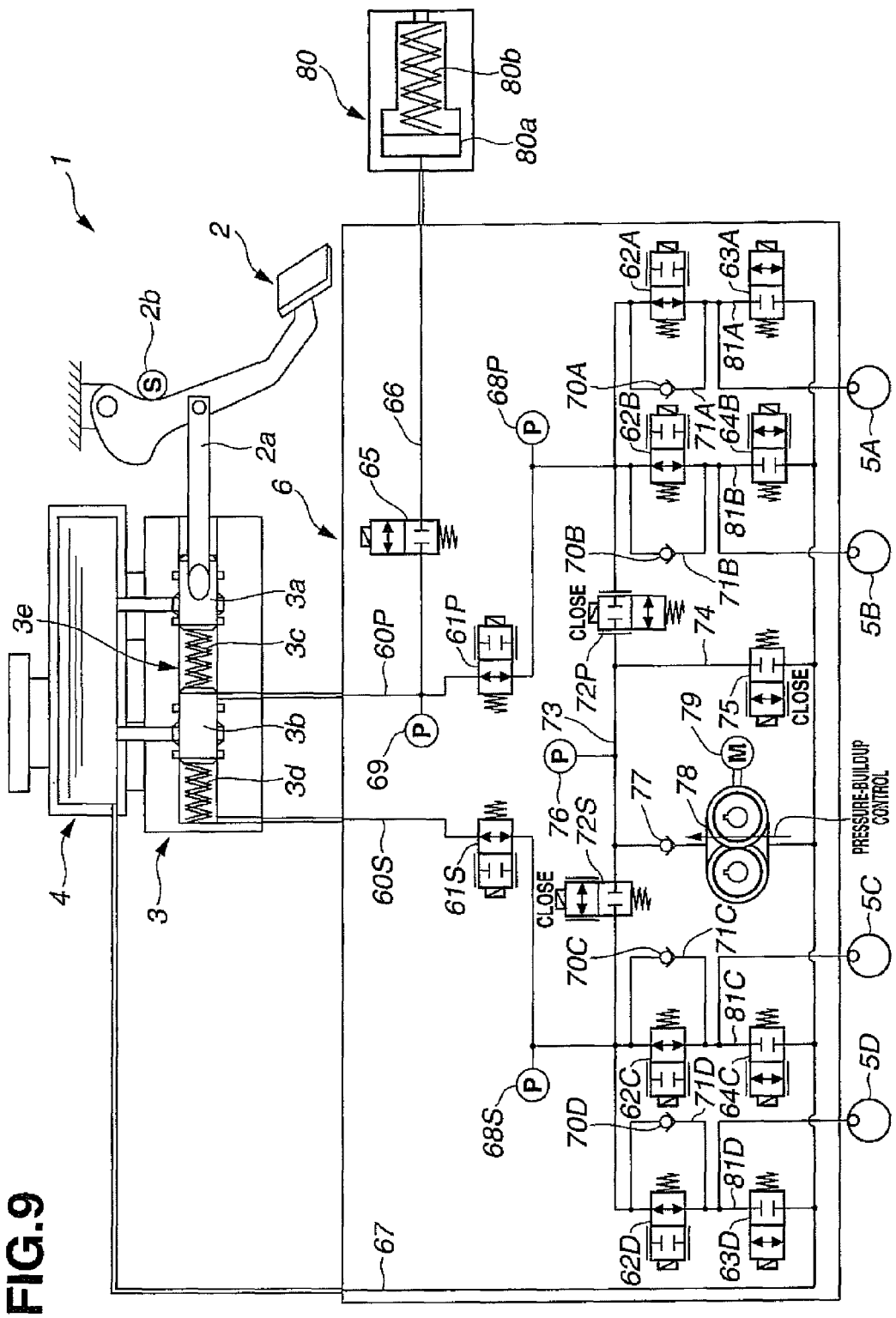
FIG. 9 is a diagram illustrating a control action of brake fluid pressure control when pressure-buildup abnormality detection processing has been executed.

At step S6, communicating valves 72 are kept closed, pressure-regulating valve 75 is kept closed, and motor 79 is driven, and then the routine proceeds to step S7. FIG. 9 is the diagram showing the control of brake fluid pressure control unit 6 when the process of step S6 has been executed. Motor 79 is driven and thus brake fluid stored in the reservoir tank 4, is fed into the communicating fluid path 73 via the pump 78. At this time, communicating valves 72 and pressure-regulating valve 75 are all kept closed. Hence, assuming that pump 78 is driven or operated normally, the fluid pressure in the communicating fluid path 73 rises. The fluid-pressure rise can be detected by means of the communicating-fluid-path fluid pressure sensor 76. As previously discussed, communicating valves 72 and pressure-regulating valve 75 are all kept closed and thus the communicating fluid path 73 serves as a closed circuit. For the reasons discussed above, a small amount of brake fluid discharged from the pump 78 produces a fluid pressure in the communicating fluid path 73. Thus, it is possible to fulfil the pressure-buildup abnormality detection, while suppressing the drive (the operation) of the pump 78. Furthermore, it is possible to fulfil the pressure-buildup abnormality detection by means of the circuit in brake fluid pressure control unit 6. By the way, the hydraulic rigidity is determined for each individual brake fluid pressure control unit 6, and thus a determination condition (a decision criterion) can be kept constant regardless of the type of vehicles on which the brake fluid pressure control unit is mounted.

At step S7, a check is made to determine whether the fluid pressure in the communicating fluid path 73, detected by the communicating-fluid-path fluid pressure sensor 76, is greater than or equal to a predetermined pressure value. When the detected fluid pressure is greater than or equal to the predetermined pressure value, the routine proceeds to step S8. Conversely when the detected fluid pressure is less than the predetermined pressure value, the routine proceeds to step S9. At this time, communicating valves 72 and pressure-regulating valve 75 are all kept closed and thus the fluid pressure in the communicating fluid path 73 becomes equal to the discharge pressure of pump 78.

At step S8, a determination of a pressure-buildup normality is made, and then the routine proceeds to step S4. The aforementioned pressure-buildup normality means a state where communicating valves 72, pressure-regulating valve 75, pump 78, and motor 79 are all operating normally, thus enabling booster control to be executed.

At step S9, a check is made to determine whether a counted value of the determination timer T1 is greater than a predetermined value. When T1>the predetermined value, the routine proceeds to step S10. Conversely when T1≤the predetermined value, the routine proceeds to step S12. The determination timer T1 is a timer configured to wait for a fluid-pressure pressure-buildup abnormality determination through the use of pump 78 to be made until such time that a discharge pressure rises sufficiently from the time when the pump 78 begins to be driven.

At step S10, a determination of a pressure-buildup abnormality is made, and then the routine proceeds to step S11.

At step S11, a warning system comes into operation, and then the current processing terminates. The aforementioned warning system, which comes into operation, means turning-ON action of a warning lamp or a buzzing sound emitted from a warning buzzer, thereby informing the driver of the occurrence of an abnormality (a failure) in the brake system.

At step S12, the determination timer T1 is incremented, and then the current processing terminates.

(Abnormality-Point-Specifying Processing)

As discussed previously, it is possible to detect a pressure-buildup abnormality by only the pressure-buildup detection processing. However, it is impossible to specify an abnormality point by the pressure-buildup detection processing. Therefore, subsequently to the above, abnormality-point-specifying processing (hereunder explained in detail) is executed.

Figure 10:
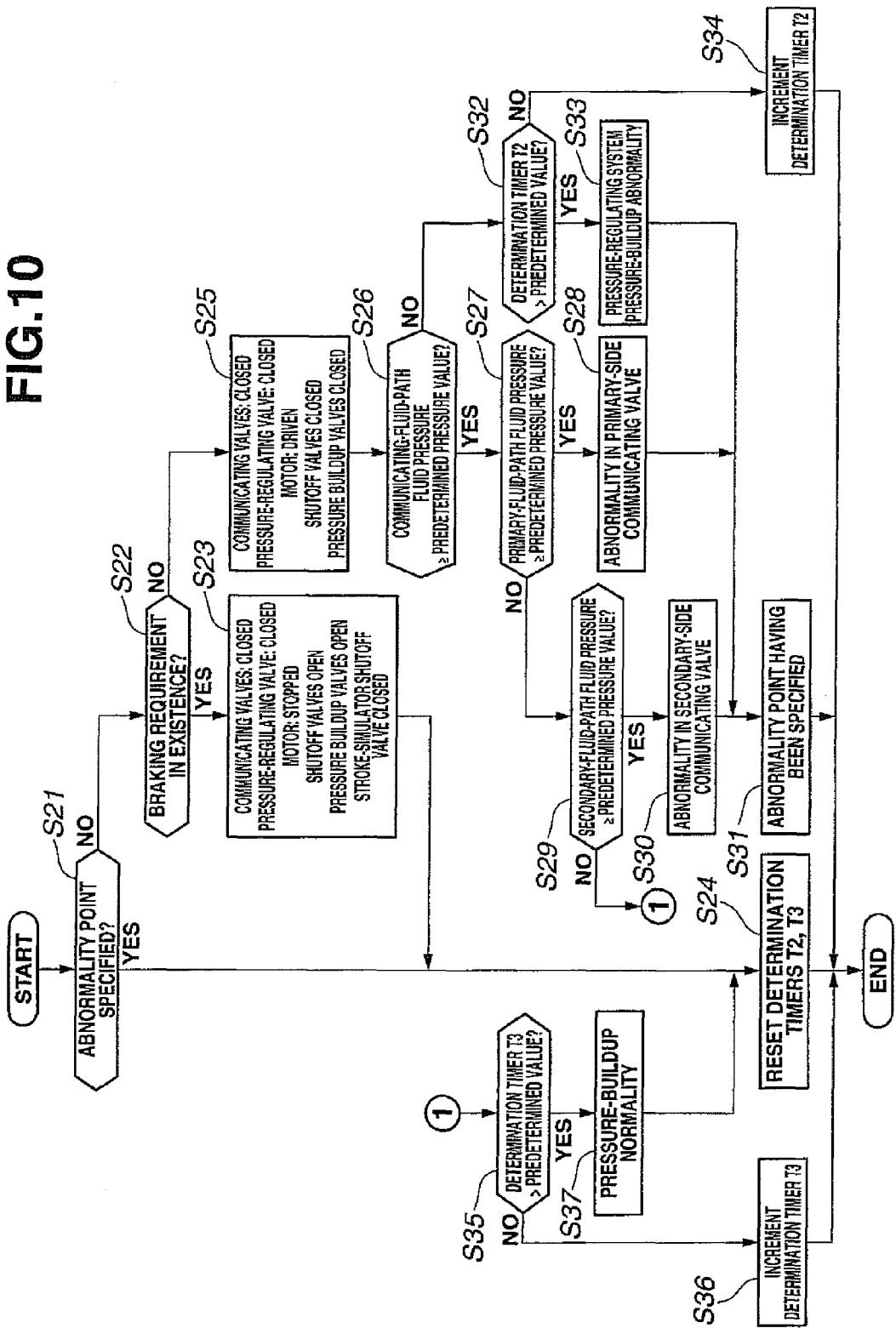
FIG. 10 is a flowchart illustrating a control flow for specifying an abnormality point in the first embodiment.

Referring to FIG. 10, there is shown the flowchart illustrating the control flow executed within the pressure-buildup abnormality detection part 95 for detecting or specifying an abnormality point.

At step S21, a check is made to determine whether an abnormality point has already been specified. When an abnormality point has been specified, the routine proceeds to step S24. Conversely when an abnormality point has not yet specified, the routine proceeds to step S22.

At step S22, a check is made to determine whether a braking requirement is present or absent. In the presence of a braking requirement, the routine proceeds to step S23. Conversely in the absence of a braking requirement, the routine proceeds to step S25.

At step S23, communicating valves 72 are kept closed, pressure-regulating valve 75 is kept closed, motor 79 is stopped, shutoff valves 61 are kept open, pressure buildup valves 62 are kept open, and stroke-simulator shutoff valve 65 is kept closed, and then the routine proceeds to step S24. When the process of step S23 has been executed, the control (see FIG. 5) of brake fluid pressure control unit 6 in the presence of a pressure-buildup abnormality is performed together. Accordingly, brake fluid is supplied into the wheel cylinder 5 under master cylinder pressure. Thus, any multiplying action cannot be produced, but a minimum braking force can be ensured.

At step S24, a determination timer T2 and a determination timer T3 are both reset, and then the current routine terminates.

Figure 11:
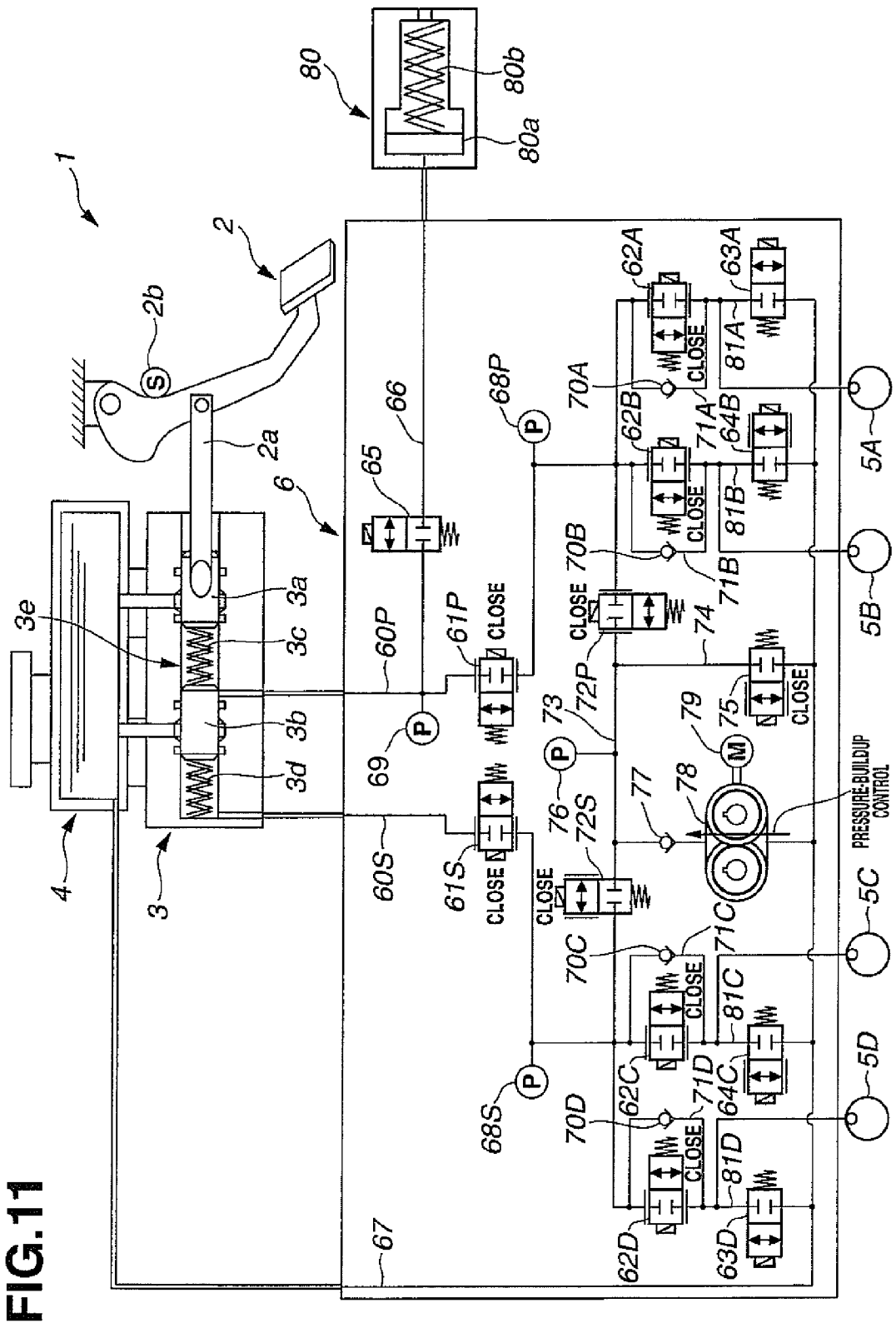
FIG. 11 is a diagram illustrating a control action of brake fluid pressure control when abnormality-point-specifying processing has been executed.

At step S25, communicating valves 72 are kept closed, pressure-regulating valve 75 is kept closed, motor 79 is driven, shutoff valves 61 are kept closed, and pressure buildup valves 62 are kept closed, and then the routine proceeds to step S26. FIG. 11 is the diagram showing the control of brake fluid pressure control unit 6 when the process of step S25 has been executed. Motor 79 is driven and thus brake fluid stored in the reservoir tank 4, is fed into the communicating fluid path 73 via the pump 78. At this time, assuming that communicating valves 72 and pressure-regulating valve 75 are closed normally and pump 78 is driven normally, the fluid pressure in the communicating fluid path 73 tends to rise. The fluid-pressure rise can be detected by means of the communicating-fluid-path fluid pressure sensor 76. Also, assuming that shutoff valves 61 are closed normally even under a specific condition in which communicating valves 72 and pressure-regulating valve 75 are not closed normally, the fluid pressure in the communicating fluid path 73 rises by driving the pump 78, and hence the primary-fluid-path fluid pressure and the secondary-fluid-path fluid pressure also rise.

At step S26, a check is made to determine whether the fluid pressure in the communicating fluid path 73, detected by the communicating-fluid-path fluid pressure sensor 76, is greater than or equal to a predetermined pressure value. When the detected fluid pressure is greater than or equal to the predetermined pressure value, the routine proceeds to step S27. Conversely when the detected fluid pressure is less than the predetermined pressure value, the routine proceeds to step S32.

At step S27, a check is made to determine whether the primary-fluid-path fluid pressure, detected by the primary-fluid-path fluid pressure sensor 68P, is greater than or equal to a predetermined pressure value. When the fluid pressure is greater than or equal to the predetermined pressure value, the routine proceeds to step S28. Conversely when the fluid pressure is less than the predetermined pressure value, the routine proceeds to step S29.

At step S28, it is determined that an abnormality in the primary-side communicating valve 72P occurs, and then the routine proceeds to step S31.

At step S29, a check is made to determine whether the secondary-fluid-path fluid pressure, detected by the secondary-fluid-path fluid pressure sensor 68S, is greater than or equal to a predetermined pressure value. When the fluid pressure is greater than or equal to the predetermined pressure value, the routine proceeds to step S30. Conversely when the fluid pressure is less than the predetermined pressure value, the routine proceeds to step S35.

At step S30, it is determined that an abnormality in the secondary-side communicating valve 72S occurs, and then the routine proceeds to step S31.

At step S31, it is determined that an abnormality point has been specified, and then the current routine terminates.

At step S32, a check is made to determine whether a counted value of the determination timer T2 is greater than a predetermined value. When T2>the predetermined value, the routine proceeds to step S33. Conversely when T2≤the predetermined value, the routine proceeds to step S34. The determination timer T2 is a timer configured to wait for a pressure-buildup abnormality determination through the use of pump 78 to be made until such time that a discharge pressure rises sufficiently from the time when the pump 78 begins to be driven.

At step S33, a determination of a pressure-regulating system pressure-buildup abnormality is made, and then the routine proceeds to step S31. The aforementioned pressure-regulating system pressure-buildup abnormality means a state where a pressure buildup cannot be achieved by the pump 78 due to the occurrence of an abnormality (a failure) in any one of the motor 79, the pump 78, and the pressure-regulating valve 75.

At step S34, the determination timer T2 is incremented, and then the current processing terminates.

At step S35, a check is made to determine whether a counted value of the determination timer T3 is greater than a predetermined value. When T3>the predetermined value, the routine proceeds to step S37. Conversely when T3≤the predetermined value, the routine proceeds to step S36. The determination timer T3 is a timer configured to wait for a pressure-buildup abnormality determination through the use of pump 78 to be made until such time that a discharge pressure rises sufficiently from the time when the pump 78 begins to be driven.

At step S36, the determination timer T3 is incremented, and then the current processing terminates.

At step S37, a determination of a pressure-buildup normality is made, and then the routine proceeds to step S24.

(Pressure-Reduction Abnormality Detection Processing)

Figure 12:
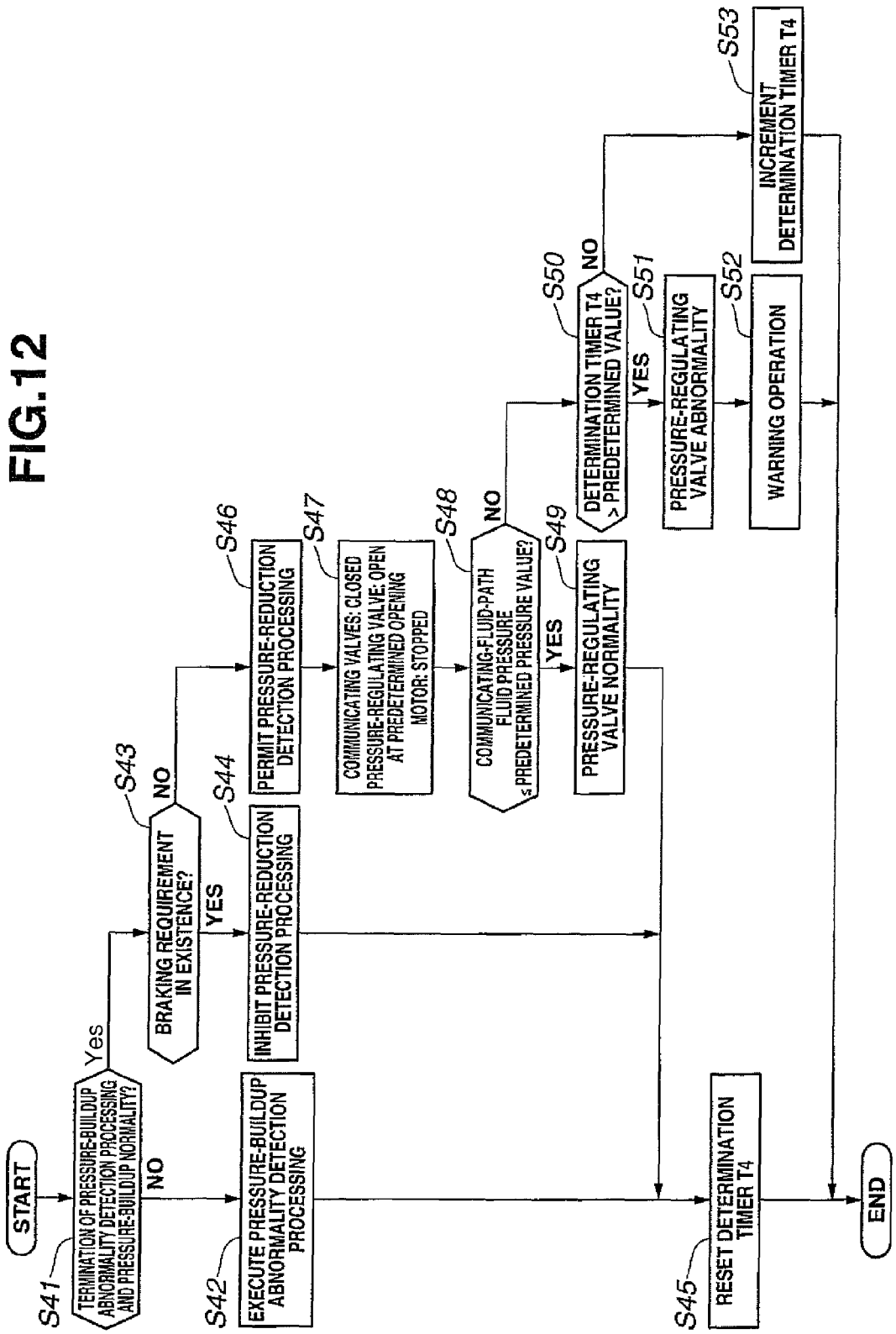
FIG. 12 is a flowchart illustrating a control flow for detecting a pressure-reduction abnormality in the first embodiment.

Referring to FIG. 12, there is shown the flowchart illustrating the control flow executed within the pressure-reduction abnormality detection part 96 for detecting a pressure-reduction abnormality.

At step S41, a check is made to determine whether a determination of a pressure-buildup normality has been made after termination of pressure-buildup abnormality detection processing. When a determination of a pressure-buildup normality has been made, the routine proceeds to step S43. In contrast, when pressure-buildup abnormality detection processing has not yet terminated or when a determination of a pressure-buildup abnormality has been made, the routine proceeds to step S42.

At step S42, a command for executing pressure-buildup abnormality detection processing is generated, and then the routine proceeds to step S45.

At step S43, a check is made to determine whether a braking requirement is present or absent. In the presence of a braking requirement, the routine proceeds to step S44. Conversely in the absence of a braking requirement, the routine proceeds to step S46.

At step S44, pressure-reduction abnormality detection processing is inhibited and then the routine proceeds to step S45.

At step S45, a determination timer T4 is reset, and then the current processing terminates.

At step S46, pressure-reduction abnormality detection processing is permitted and then the routine proceeds to step S47.

Figure 13:
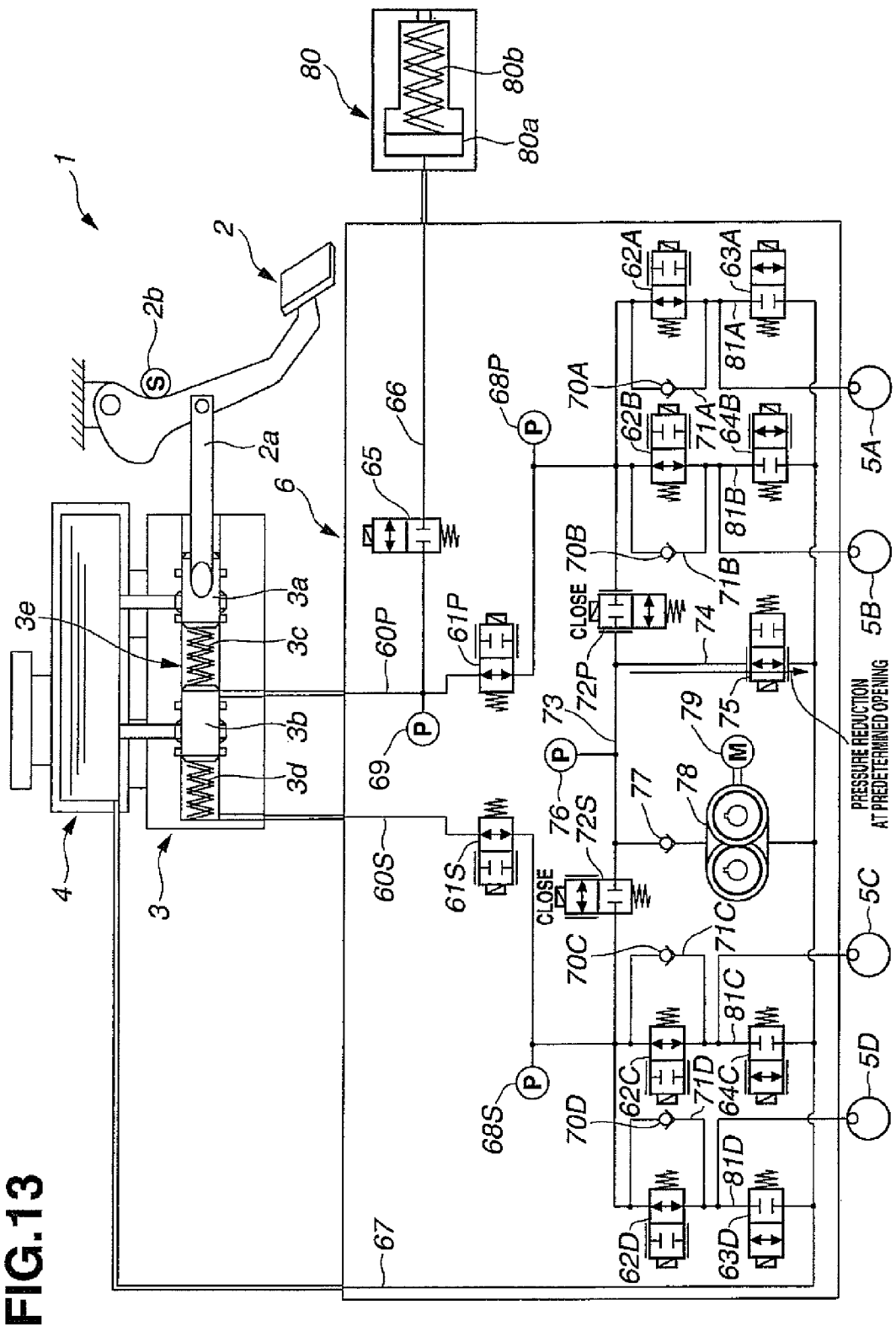
FIG. 13 is a diagram illustrating a control action of brake fluid pressure control when pressure-reduction abnormality detection processing has been executed.

At step S47, communicating valves 72 are kept closed, pressure-regulating valve 75 is opened at a predetermined opening, and motor 79 is stopped, and then the routine proceeds to step S48. FIG. 13 is the diagram showing the control of brake fluid pressure control unit 6 when the process of step S47 has been executed. In the case of a pressure-buildup normality after pressure-buildup abnormality detection processing has terminated, the fluid pressure in the communicating fluid path 73 becomes a high-pressure state. At this time, the fluid pressure in the communicating fluid path 73 reduces by opening the pressure-regulating valve 75 at a predetermined opening. The fluid-pressure reduction can be detected by means of the communicating-fluid-path fluid pressure sensor 76.

At step S48, a check is made to determine whether the fluid pressure in the communicating fluid path 73, detected by the communicating-fluid-path fluid pressure sensor 76, is less than or equal to a predetermined pressure value. When the detected fluid pressure is less than or equal to the predetermined pressure value, the routine proceeds to step S49. Conversely when the fluid pressure is greater than the predetermined pressure value, the routine proceeds to step S50.

At step S49, it is determined that the pressure-regulating valve 75 is normal, and then the routine proceeds to step S45.

At step S50, a check is made to determine whether a counted value of the determination timer T4 is greater than a predetermined value. When T4>the predetermined value, the routine proceeds to step S51. Conversely when T4≤the predetermined value, the routine proceeds to step S53.

At step S51, it is determined that an abnormality in the pressure-regulating valve 75 occurs, and then the routine proceeds to step S52.

At step S52, a warning system comes into operation, and then the current processing terminates.

At step S53, the determination timer T4 is incremented, and then the current processing terminates.

(Pressure-Hold Abnormality Detection Processing)

Pressure-hold abnormality detection processing may be performed between the previously-discussed pressure-buildup abnormality detection processing and the previously-discussed pressure-reduction abnormality detection processing.

When a determination of a pressure-buildup normality has been made after termination of pressure-buildup abnormality detection processing, pressure-hold abnormality detection processing may be executed. In the pressure-hold abnormality detection processing, under a state where communicating valves 72 are kept closed, pressure-regulating valve 75 is kept closed, and motor 79 is stopped, a check for the fluid pressure in the communicating fluid path 73, detected by the communicating-fluid-path fluid pressure sensor 76, is made. When the detected fluid pressure is kept constant, a determination of a pressure-hold normality is made.

(Processing after Abnormality Determination)

When it has been determined that an abnormality (a failure) in brake fluid pressure control unit 6 occurs, a control suitable for its abnormality point is executed. FIG. 14 is the diagram illustrating the control-mode table for control modes suitable for respective abnormality points.

As shown in FIG. 14, when a determination of a pressure-regulating system pressure-buildup abnormality has been made, pressure-buildup abnormality fluid pressure control is executed. At the pressure-buildup abnormality fluid pressure control mode, brake fluid pressure control unit 6 is controlled by means of the previously-discussed pressure-buildup fluid pressure control part 93 as shown in FIG. 5. Accordingly, brake fluid is supplied into the wheel cylinder 5 under master cylinder pressure. Thus, any multiplying action cannot be produced, but a minimum braking force can be ensured.

When a determination of a pressure-regulating valve abnormality has been made, pressure-reduction abnormality fluid pressure control is executed. At the pressure-reduction abnormality fluid pressure control mode, brake fluid pressure control unit 6 is controlled by means of the previously-discussed pressure-reduction fluid pressure control part 94 as shown in FIG. 6. That is, back-up pressure reduction valves 64 are used instead of the pressure-regulating valve 75, which is determined or regarded as to be failed (abnormal). By the way, back-up pressure reduction valve 64B is arranged on the primary side, whereas back-up pressure reduction valve 64C is arranged on the secondary side. When an abnormality (a failure) in the pressure-regulating valve 75 occurs, either one of the back-up pressure reduction valves may be used instead of the pressure-regulating valve 75. Alternatively, both of the back-up pressure reduction valves may be used instead of the pressure-regulating valve.

When a determination of a communicating-valve abnormality has been made, booster fluid pressure control is executed. At the booster fluid pressure control mode, brake fluid pressure control unit 6 is controlled by means of the previously-discussed booster fluid pressure control part 90 as shown in FIG. 3. That is, the brake fluid pressure control unit is controlled in the same manner as set forth in regard to the control of the brake fluid pressure control unit 6 operating normally. However, a warning system comes into operation, since an abnormality in communicating valve 72 occurs.

(Action of Abnormality Determination Processing)

Figure 15:
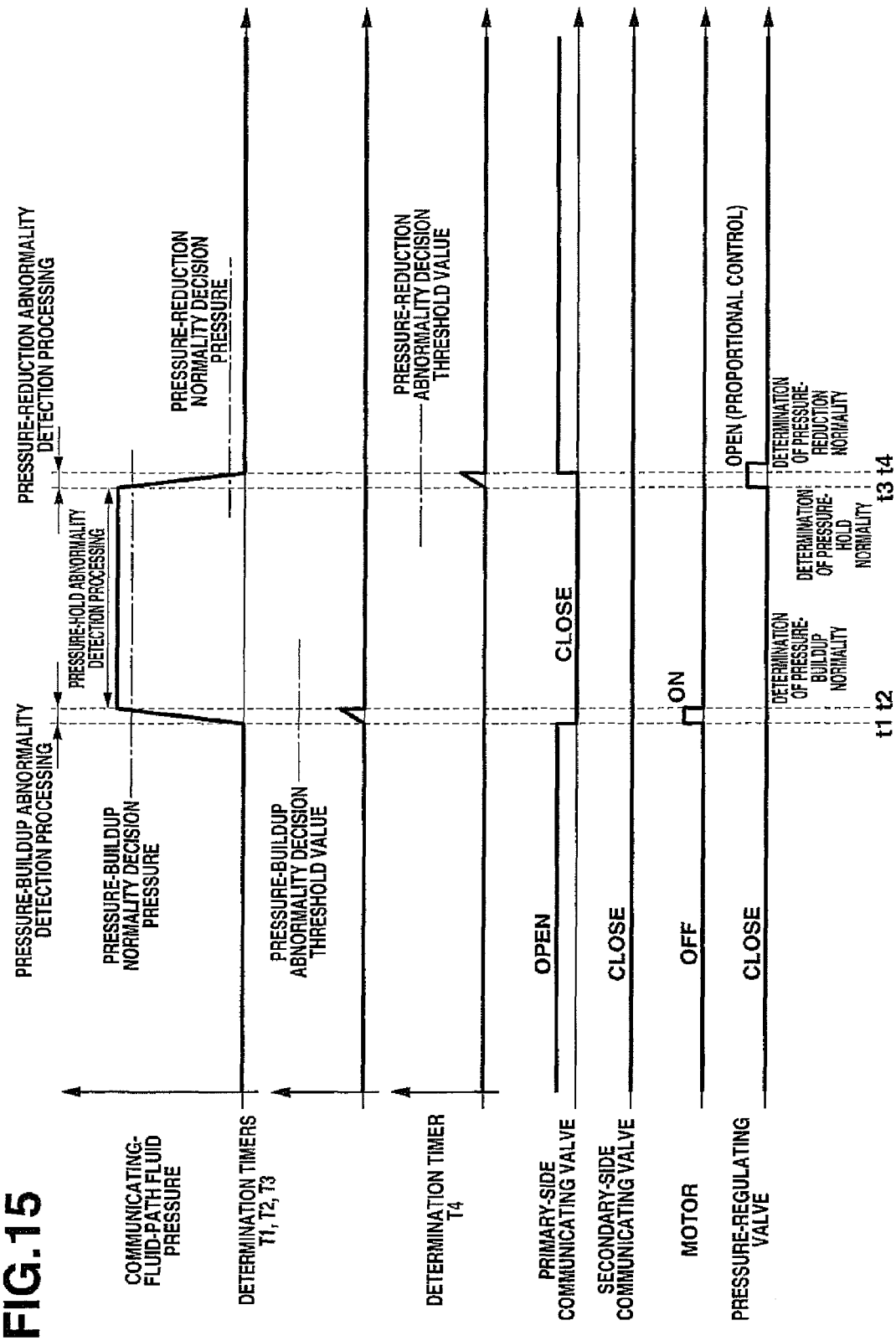
FIG. 15 is a time chart illustrating abnormality determination processing in the first embodiment.

Referring to FIG. 15, there is shown the time chart illustrating abnormality determination processing. At the time t1 when a braking requirement is absent, pressure-buildup abnormality determination processing is executed. During execution of the pressure-buildup abnormality determination processing, communicating valves 72 are kept closed, pressure-regulating valve 75 is kept closed, and motor 79 is driven. When the fluid pressure in the communicating fluid path 73 becomes greater than or equal to a predetermined pressure value (a pressure-buildup decision pressure) before each of determination timers T1, T2, T3 reaches a predetermined value (a pressure-buildup abnormality decision threshold value), a determination of a pressure-buildup normality is made (see the time t2).

Immediately when such pressure-buildup abnormality detection processing terminates, pressure-hold abnormality detection processing is executed. During the pressure-hold abnormality detection processing, communicating valves 72 are kept closed, pressure-regulating valve 75 is kept closed, and motor 79 is stopped. At this time, when the fluid pressure in the communicating fluid path 73 does not decrease, a determination of a pressure-hold normality is made (see the time t3).

Immediately when such pressure-hold abnormality detection processing terminates, pressure-reduction abnormality detection processing is executed. During the pressure-reduction abnormality detection processing, communicating valves 72 are kept closed, pressure-regulating valve 75 is kept open, and motor 79 is stopped. When the fluid pressure in the communicating fluid path 73 becomes less than or equal to a predetermined pressure value (a pressure-reduction decision pressure) before determination timer T4 reaches a predetermined value (a pressure-reduction abnormality decision threshold value), a determination of a pressure-reduction normality is made (see the time t4).

[Operation]

The system of the first embodiment that produces a multiplying action by the pump incorporated in the brake fluid pressure control unit is often equipped with an accumulator in which brake fluid (brake fluid pressure) is always stored, for a booster-action disabling state where any multiplying action cannot be produced by the pump. In this case, it is possible to detect the occurrence of pressure-buildup abnormality in the fluid pressure even during vehicle running by monitoring the internal pressure in the accumulator.

In the accumulator-equipped system, there is a problem that the brake fluid pressure control unit itself is large-sized. To avoid this, it is thought that the accumulator is eliminated. Due to the eliminated accumulator, in order to assure the reliability of the system, pressure-buildup detection processing has to be frequently executed. However, in the case of a non-accumulator equipped system, for the purpose of detecting pressure-buildup abnormality, a pump has to be driven. Driving the pump results in a wheel-cylinder pressure, and hence it is impossible to fulfil pressure-buildup abnormality detection processing during vehicle running.

Therefore, the system of the first embodiment is configured such that communicating fluid path 73 that connects the primary fluid path 60P and the secondary fluid path 60S is provided, and brake fluid is discharged from the pump 78 into the communicating fluid path 73. Furthermore, communicating valve 72P is provided between the communicating fluid path 73 and the primary fluid path 60P. Also, communicating valve 72S is provided between the communicating fluid path 73 and the secondary fluid path 60S. With the arrangement, pressure-regulating system abnormality detection is performed by driving the pump 78 under a condition where communicating valve 72P and communicating valve 72S are kept closed by valve-closing control. Accordingly, when the pump 78 is driven under such a condition where communicating valve 72P and communicating valve 72S are kept closed, there is no supply of brake fluid from the pump 78 into the primary fluid path 60P and the secondary fluid path 60S. Hence, even during vehicle running, it is possible to detect an abnormality (a failure) in the pressure-regulating system without producing a wheel cylinder pressure.

Also provided is the reflux fluid path 74 arranged between the primary-side communicating valve 72P and the pump 78 for returning brake fluid discharged into the communicating fluid path 73 back to the suction side of pump 78. Hence, a circulation circuit can be formed or established between the discharge side and the suction side of pump 78 by keeping both the primary-side communicating valve 72P and the secondary-side communicating valve 72S closed. Thus, it is possible to drive the pump 78 without delivering brake fluid into the side of each wheel cylinder 5 even during vehicle running.

Also provided is the pressure-regulating valve 75 disposed in the reflux fluid path 74. When detecting an abnormality in the pressure-regulating system, the pressure-regulating valve 75 is controlled. Hence, it is possible to detect an abnormality in the control for the amount of brake fluid supplied from the pump 78 into the primary fluid path 60P and the secondary fluid path 60S.

Additionally, one of the primary-side communicating valve 72P and the secondary-side communicating valve 72S is controlled in a valve-opening direction, the other communicating valve is controlled in a valve-closing direction, and then pump 78 is driven. Thus, the brake fluid is delivered into the fluid path in the system whose communicating valve has been controlled in the valve-opening direction. Hence, even when the one-system fluid path has failed, it is possible to ensure a braking force through the use of the other-system fluid path.

Additionally, communicating valve 72P, communicating valve 72S, and pressure-regulating valve 75 are controlled to respective valve-closing directions, and then pump 78 is driven. Thus, pressure-buildup abnormality detection is performed based on a detected value of the communicating-fluid-path fluid pressure sensor 76. Accordingly, when the pump 78 is driven under such a condition where communicating valve 72P and communicating valve 72S are kept closed, there is no supply of brake fluid from the pump 78 into the primary fluid path 60P and the secondary fluid path 60S. Hence, even during vehicle running, it is possible to execute pressure-buildup abnormality detection processing without producing a wheel cylinder pressure.

Additionally, communicating valve 72P, communicating valve 72S, and pressure-regulating valve 75 are controlled to respective valve-closing directions, and then pump 78 is driven. Thereafter, the pressure-regulating valve is controlled to a valve-opening direction so as to reduce the fluid pressure of the brake fluid, whose pressure has been built up. Thus, pressure-reduction abnormality detection processing is performed based on a detected value of the communicating-fluid-path fluid pressure sensor 76. Hence, even during vehicle running, it is possible to execute pressure-reduction abnormality detection processing without varying a wheel cylinder pressure.

Additionally, communicating valve 72P, communicating valve 72S, and pressure-regulating valve 75 are controlled to respective valve-closing directions, and then pump 78 is driven for building up brake fluid in the communicating fluid path 73. Thereafter, pump 78 is stopped. Thus, pressure-hold abnormality detection processing is performed based on a detected value of the communicating-fluid-path fluid pressure sensor 76. Hence, even during vehicle running, it is possible to execute pressure-hold abnormality detection processing without varying a wheel cylinder pressure.

Additionally, through the use of the circulation circuit formed or established as previously discussed, each abnormality detection processing can be made. Hence, even when, during abnormality detection processing, the brake pedal is depressed by the driver, brake fluid, which is sent from the master cylinder 3 into the brake fluid pressure control unit 6, is supplied into the side of wheel cylinder 5. Thus, it is possible to ensure a braking force without deteriorating pedal feel.

[Effects]

The effects of the brake device 1 of the first embodiment are hereunder enumerated.

(1) A brake device includes a primary fluid path 60P equipped with a plurality of wheel cylinders 5A, 5B, which are pressurized by a master cylinder pressure produced by a primary fluid pressure chamber 3c (a first chamber) of a master cylinder 3 that produces a brake fluid pressure by a pedal operation by a driver, a secondary fluid path 60S equipped with a plurality of wheel cylinders 5C, 5D, which are pressurized by a master cylinder pressure produced by a secondary fluid pressure chamber 3d (a second chamber) of the master cylinder 3, a communicating fluid path 73 configured to connect the primary fluid path 60P and the secondary fluid path 60S, a pump 78 configured to discharge brake fluid into the communicating fluid path 73, a communicating valve 72P (a first communicating valve) disposed in the communicating fluid path 73 for restricting a flow of the brake fluid from the communicating fluid path 73 to the primary fluid path 60P, a communicating valve 72S (a second communicating valve) disposed in the communicating fluid path 73 for restricting a flow of the brake fluid from the communicating fluid path 73 to the secondary fluid path 60S, and a controller 9 having a pump-state check part (i.e., a pressure-buildup abnormality detection part 95, a pressure-reduction abnormality detection part 96, and a pressure-hold abnormality detection part 97) for checking at least a state of the pump 78 by driving the pump 78 and by controlling the communicating valve 72P and the communicating valve 72S in respective valve-closing directions.

Hence, there is no supply of brake fluid from the pump 78 into the primary fluid path 60P and the secondary fluid path 60S. Thus, even during vehicle running, it is possible to detect an abnormality (a failure) in the pressure-regulating system without producing a wheel cylinder pressure.

(2) A reflux fluid path 74 is further provided between at least one communicating valve of the communicating valve 72P and the communicating valve 72S and the pump 78 for returning the brake fluid discharged into the communicating fluid path 73 back to a suction side of the pump 78.

Hence, a circulation circuit can be formed or established between the discharge side and the suction side of pump 78 by keeping both the primary-side communicating valve 72P and the secondary-side communicating valve 72S closed. Thus, it is possible to drive the pump 78 without delivering brake fluid into the side of each wheel cylinder 5 even during vehicle running.

(3) A pressure-regulating valve 75 is further disposed in the reflux fluid path 74. The controller 9 is configured to control the pressure-regulating valve 75 when detecting an abnormality by the pressure-buildup abnormality detection part 95, the pressure-reduction abnormality detection part 96, and the pressure-hold abnormality detection part 97.

Hence, it is possible to detect an abnormality in the control for the amount of brake fluid supplied from the pump 78 into the primary fluid path 60P and the secondary fluid path 60S.

(4) The controller 9 has a one-sided system fluid pressure control part 92 configured to control one communicating valve of the communicating valve 72P and the communicating valve 72S in a valve-opening direction, and to control the other communicating valve in a valve-closing direction, and to drive the pump 78, so as to deliver the brake fluid into the fluid path of the system whose communicating valve has been controlled in the valve-opening direction.

Hence, even when the one-system fluid path has failed, it is possible to ensure a braking force through the use of the other-system fluid path.

(5) Also provided is a communicating-fluid-path fluid pressure sensor 76 configured to detect a fluid pressure in the communicating fluid path 73. The controller 9 has a pressure-buildup abnormality detection part 95 configured to control the communicating valve 72P, the communicating valve 72S, and the pressure-regulating valve 75 to respective valve-closing directions, and to drive the pump 78, so as to perform pressure-buildup abnormality detection based on a detected value of the communicating-fluid-path fluid pressure sensor 76.

Hence, even during vehicle running, it is possible to execute pressure-buildup abnormality detection processing without producing a wheel cylinder pressure.

(6) Also provided is a communicating-fluid-path fluid pressure sensor 76 configured to detect a fluid pressure in the communicating fluid path 73. The controller 9 has a pressure-reduction abnormality detection part 96 configured to control the communicating valve 72P, the communicating valve 72S, and the pressure-regulating valve 75 to respective valve-closing directions, and to drive the pump 78, and thereafter to reduce the fluid pressure of the brake fluid, whose pressure has been built up, by controlling the pressure-regulating valve 75 to a valve-opening direction, so as to perform pressure-reduction abnormality detection based on a detected value of the communicating-fluid-path fluid pressure sensor 76.

Hence, even during vehicle running, it is possible to execute pressure-reduction abnormality detection processing without varying a wheel cylinder pressure.

(7) Also provided is a communicating-fluid-path fluid pressure sensor 76 configured to detect a fluid pressure in the communicating fluid path 73. The controller 9 has a pressure-hold abnormality detection part 97 configured to control the communicating valve 72P, the communicating valve 72S, and the pressure-regulating valve 75 to respective valve-closing directions, and to drive the pump 78 for building up the fluid pressure of the brake fluid in the communicating fluid path 73, and thereafter to stop the pump 78, so as to perform pressure-hold abnormality detection based on a detected value of the communicating-fluid-path fluid pressure sensor 76.

Hence, even during vehicle running, it is possible to execute pressure-hold abnormality detection processing without varying a wheel cylinder pressure.

[Other Embodiments]

While the foregoing is a description of the preferred embodiments (the first embodiment) carried out the invention, it will be understood that the invention is not limited to the particular embodiments shown and described herein, but that various changes and modifications may be made without departing from the scope or spirit of this invention.

For instance, in the first embodiment, an operation amount of brake pedal 2 by the driver is detected by the stroke sensor 2b. The pedal operation amount may be detected by the master-cylinder pressure sensor 69. In lieu thereof, the pedal operation amount may be detected by the use of a leg-power sensor that detects a leg power of brake pedal 2.

Also, in the first embodiment, only the pump 78 is used as a booster. Another boosters, such as a negative pressure booster, an electric booster, a hydraulic booster and the like, may be combined with the pump. The system may be configured to produce a multiplying action by the use of the combined boosters in a wheel cylinder pressure range less than or equal to a full-load point of the combined boosters, and to produce a multiplying action by the use of the pump 78 in a wheel cylinder pressure range greater than the full-load point of the combined boosters.

Also, in the first embodiment, master cylinder 3, brake fluid pressure control unit 6, and stroke simulator 80 are configured to be separated from each other. In lieu thereof, two components selected from these three components or all of these three components may be combined with each other and integrally formed as a unit.

[Other Technical Ideas]

The other technical ideas grasped from the embodiments shown and described are enumerated and described together with their effects, as follows:

(ｲ) A brake device is characterized by a fluid path of a primary system equipped with a plurality of wheel cylinders, which are pressurized by a master cylinder pressure produced by a primary chamber of a master cylinder that produces a brake fluid pressure by a pedal operation by a driver, a fluid path of a secondary system equipped with a plurality of wheel cylinders, which are pressurized by a master cylinder pressure produced by a secondary chamber of the master cylinder, a communicating fluid path configured to connect the fluid path of the primary system and the fluid path of the secondary system, a pump configured to discharge brake fluid into the communicating fluid path, and a controller having a pump-state check part configured to separate the communicating fluid path from each of the fluid path of the primary system and the fluid path of the secondary system and to drive the pump for permitting the brake fluid in the communicating fluid path to flow, so as to check a state of the pump.

Hence, there is no supply of brake fluid from the pump into the fluid path of the primary system and the fluid path of the secondary system. Thus, even during vehicle running, it is possible to detect an abnormality (a failure) in the pressure-regulating system without producing a wheel cylinder pressure.

(ロ) In the brake device as recited in the item (イ) also provided are a first communicating valve disposed in the communicating fluid path for restricting a flow of the brake fluid from the communicating fluid path to the fluid path of the primary system, and a second communicating valve disposed in the communicating fluid path for restricting a flow of the brake fluid from the communicating fluid path to the fluid path of the secondary system. The brake device is characterized in that the communicating fluid path is separated from each of the fluid path of the primary system and the fluid path of the secondary system by the first communicating valve and the second communicating valve.

Hence, by closing both the first communicating valve and the second communicating valve, there is no supply of brake fluid from the pump into the fluid path of the primary system and the fluid path of the secondary system. Thus, even during vehicle running, it is possible to detect an abnormality (a failure) in the pressure-regulating system without producing a wheel cylinder pressure.

(ハ) The brake device as recited in the item (ロ) is characterized in that the controller has a one-sided system fluid pressure control part configured to control one communicating valve of the first communicating valve and the second communicating valve in a valve-opening direction, and to control the other communicating valve in a valve-closing direction, and to drive the pump, so as to deliver the brake fluid into the fluid path of the system whose communicating valve has been controlled in the valve-opening direction.

Hence, even when the one-system fluid path has failed, it is possible to ensure a braking force through the use of the other-system fluid path.

(ニ) The brake device as recited in the item (ハ) is characterized by a reflux fluid path provided between at least one communicating valve of the first communicating valve and the second communicating valve and the pump for returning the brake fluid discharged into the communicating fluid path back to a suction side of the pump, a pressure-regulating valve disposed in the reflux fluid path, and a fluid pressure detection part configured to detect a fluid pressure of the brake fluid discharged from the pump, and a controller configured to control the first communicating valve, the second communicating valve, the pressure-regulating valve, and the pump. The controller has a pressure-buildup abnormality detection part configured to control the first communicating valve, the second communicating valve, and the pressure-regulating valve to respective valve-closing directions, and to drive the pump, so as to detect a pressure-buildup state based on a detected value of the fluid pressure detection part.

Hence, even during vehicle running, it is possible to execute pressure-buildup abnormality detection processing without producing a wheel cylinder pressure.

(ホ) The brake device as recited in the item (ニ) is characterized in that the controller has a pressure-hold abnormality detection part configured to control the first communicating valve, the second communicating valve, and the pressure-regulating valve to respective valve-closing directions, and to drive the pump for building up the fluid pressure of the brake fluid in the communicating fluid path, and thereafter to stop the pump, so as to detect a pressure-hold state based on a detected value of the fluid pressure detection part.

Hence, even during vehicle running, it is possible to execute pressure-hold abnormality detection processing without varying a wheel cylinder pressure.

(ヘ) The brake device as recited in the item (ホ) is characterized in that the controller has a pressure-reduction abnormality detection part configured to control the first communicating valve, the second communicating valve, and the pressure-regulating valve to respective valve-closing directions, and to drive the pump, and thereafter to reduce the fluid pressure of the brake fluid, whose pressure has been built up, by controlling the pressure-regulating valve to a valve-opening direction, so as to detect a pressure-reduction state based on a detected value of the fluid pressure detection part.

Hence, even during vehicle running, it is possible to execute pressure-reduction abnormality detection processing without varying a wheel cylinder pressure.

(ト) A brake device is characterized by a fluid path of a primary system equipped with a plurality of wheel cylinders, which are pressurized by a master cylinder pressure produced by a primary chamber of a master cylinder that produces a brake fluid pressure by a pedal operation by a driver, a fluid path of a secondary system equipped with a plurality of wheel cylinders, which are pressurized by a master cylinder pressure produced by a secondary chamber of the master cylinder, a communicating fluid path configured to connect the fluid path of the primary system and the fluid path of the secondary system, a pump configured to discharge brake fluid into the communicating fluid path, a first communicating valve disposed in the communicating fluid path for restricting a flow of the brake fluid from the communicating fluid path to the fluid path of the primary system, a second communicating valve disposed in the communicating fluid path for restricting a flow of the brake fluid from the communicating fluid path to the fluid path of the secondary system, a reflux fluid path provided between at least one communicating valve of the first communicating valve and the second communicating valve and the pump for returning the brake fluid discharged into the communicating fluid path back to a suction side of the pump, and a controller having a pump-state check part configured to form a closed circuit between a fluid path of the communicating fluid path combined with the reflux fluid path and the pump by controlling the first communicating valve and the second communicating valve in respective valve-closing directions and to drive the pump for permitting the brake fluid in the communicating fluid path to flow, so as to check a state of the pump.

Hence, there is no supply of brake fluid from the pump into the fluid path of the primary system and the fluid path of the secondary system. Thus, even during vehicle running, it is possible to detect an abnormality (a failure) in the pressure-regulating system without producing a wheel cylinder pressure.

(チ) The brake device as recited in the item (ト) is characterized by a pressure-regulating valve disposed in the reflux fluid path. The controller is configured to control the pressure-regulating valve when checking by the pump-state check part.

Hence, it is possible to detect an abnormality in the control for the amount of brake fluid supplied from the pump into the fluid path of the primary system and the fluid path of the secondary system.

(リ) The brake device as recited in the item (チ) is characterized in that the controller has a one-sided system fluid pressure control part configured to control one communicating valve of the first communicating valve and the second communicating valve in a valve-opening direction, and to control the other communicating valve in a valve-closing direction, and to drive the pump, so as to deliver the brake fluid into the fluid path of the system whose communicating valve has been controlled in the valve-opening direction.

Hence, even when the one-system fluid path has failed, it is possible to ensure a braking force through the use of the other-system fluid path.

(ヌ) The brake device as recited in the item (チ) is characterized by a reflux fluid path provided between at least one communicating valve of the first communicating valve and the second communicating valve and the pump for returning the brake fluid discharged into the communicating fluid path back to a suction side of the pump, a pressure-regulating valve disposed in the reflux fluid path, and a fluid pressure detection part configured to detect a fluid pressure of the brake fluid discharged from the pump, and a controller configured to control the first communicating valve, the second communicating valve, the pressure-regulating valve, and the pump. The controller has a pressure-buildup abnormality detection part configured to control the first communicating valve, the second communicating valve, and the pressure-regulating valve to respective valve-closing directions, and to drive the pump, so as to detect a pressure-buildup state based on a detected value of the fluid pressure detection part.

Hence, there is no supply of brake fluid from the pump into the fluid path of the primary system and the fluid path of the secondary system. Thus, even during vehicle running, it is possible to detect an abnormality in the pressure-regulating system without producing a wheel cylinder pressure.

(ル) The brake device as recited in the item (チ) is characterized in that the controller has a pressure-hold abnormality detection part configured to control the first communicating valve, the second communicating valve, and the pressure-regulating valve to respective valve-closing directions, and to drive the pump for building up the fluid pressure of the brake fluid in the communicating fluid path, and thereafter to stop the pump, so as to detect a pressure-hold state based on a detected value of the fluid pressure detection part.

Hence, even during vehicle running, it is possible to execute pressure-hold abnormality detection processing without varying a wheel cylinder pressure.

(ヲ) The brake device as recited in the item (チ) is characterized in that the controller has a pressure-reduction abnormality detection part configured to control the first communicating valve, the second communicating valve, and the pressure-regulating valve to respective valve-closing directions, and to drive the pump, and thereafter to reduce the fluid pressure of the brake fluid, whose pressure has been built up, by controlling the pressure-regulating valve to a valve-opening direction, so as to detect a pressure-reduction state based on a detected value of the fluid pressure detection part.

Hence, even during vehicle running, it is possible to execute pressure-reduction abnormality detection processing without varying a wheel cylinder pressure.

REFERENCE SIGNS LIST

3 Master cylinder
3c Primary fluid pressure chamber (First chamber)
3d Secondary fluid pressure chamber (Second chamber)
5A Wheel cylinder
5B Wheel cylinder
5C Wheel cylinder
5D Wheel cylinder
9 Controller
60P Primary fluid path
60S Secondary fluid path
72P Communicating valve (First communicating valve)
72S Communicating valve (Second communicating valve)
73 Communicating fluid path
74 Reflux fluid path
75 Pressure-regulating valve
76 Communicating-fluid-path fluid pressure sensor
78 Pump
92 One-sided system fluid pressure control part
95 Pressure-buildup abnormality detection part (Pump-state check part)
96 Pressure-reduction abnormality detection part (Pump-state check part)
97 Pressure-hold abnormality detection part (Pump-state check part)

The invention claimed is:
1. A brake device comprising:
a fluid path of a primary system equipped with a plurality of wheel cylinders, which are pressurized by a master cylinder pressure produced by a first chamber of a master cylinder that produces a brake fluid pressure by a pedal operation by a driver;
a fluid path of a secondary system equipped with a plurality of wheel cylinders, which are pressurized by a master cylinder pressure produced by a second chamber of the master cylinder;
a communicating fluid path configured to connect the fluid path of the primary system and the fluid path of the secondary system;
a pump configured to discharge brake fluid into the communicating fluid path;
a first communicating valve disposed in the communicating fluid path for restricting a flow of the brake fluid from the communicating fluid path to the fluid path of the primary system;
a second communicating valve disposed in the communicating fluid path for restricting a flow of the brake fluid from the communicating fluid path to the fluid path of the secondary system;
a reflux fluid path provided between at least one communicating valve of the first communicating valve and the second communicating valve and the pump for return- ing the brake fluid discharged into the communicating fluid path back to a suction side of the pump; and a controller having a pump-state check part for checking at least a state of the pump by driving the pump and by controlling the first communicating valve and the second communicating valve in respective valve-closing directions, wherein the controller has a one-sided system fluid pressure control part configured to control one communicating valve of the first communicating valve and the second communicating valve in a valve-opening direction, and to control the other communicating valve in a valve-closing direction, and to drive the pump, so as to deliver the brake fluid into the fluid path of the system whose communicating valve has been controlled in the valve-opening direction.

2. A brake device as recited in claim 1, which further comprises:

a pressure-regulating valve disposed in the reflux fluid path, wherein the controller is configured to control the pressure-regulating valve when checking by the pump-state check part.

3. A brake device as recited in claim 1, which further comprises:

a fluid pressure detection part configured to detect a fluid pressure in the communicating fluid path, wherein the controller has a pressure-buildup abnormality detection part configured to control the first communicating valve, the second communicating valve, and the pressure-regulating valve to respective valve-closing directions, and to drive the pump, so as to detect a pressure-buildup state based on a detected value of the fluid pressure detection part.

4. A brake device comprising:

a fluid path of a primary system equipped with a plurality of wheel cylinders, which are pressurized by a master cylinder pressure produced by a first chamber of a master cylinder that produces a brake fluid pressure by a pedal operation by a driver;

a fluid path of a secondary system equipped with a plurality of wheel cylinders, which are pressurized by a master cylinder pressure produced by a second chamber of the master cylinder;

a communicating fluid path configured to connect the fluid path of the primary system and the fluid path of the secondary system;

a pump configured to discharge brake fluid into the communicating fluid path;

a first communicating valve disposed in the communicating fluid path for restricting a flow of the brake fluid from the communicating fluid path to the fluid path of the primary system;

a second communicating valve disposed in the communicating fluid path for restricting a flow of the brake fluid from the communicating fluid path to the fluid path of the secondary system;

a reflux fluid path provided between at least one communicating valve of the first communicating valve and the second communicating valve and the pump for returning the brake fluid discharged into the communicating fluid path back to a suction side of the pump;

a fluid pressure detection part configured to detect a fluid pressure in the communicating fluid path; and a controller having a pump-state check part for checking at least a state of the pump by driving the pump and by controlling the first communicating valve and the second communicating valve in respective valve-closing directions, wherein the controller has a pressure-reduction abnormality detection part configured to control the first communicating valve, the second communicating valve, and the pressure-regulating valve to respective valve-closing directions, and to drive the pump, and thereafter to reduce the fluid pressure of the brake fluid, whose pressure has been built up, by controlling the pressure-regulating valve to a valve-opening direction, so as to detect a pressure-reduction state based on a detected value of the fluid pressure detection part.

5. A brake device as recited in claim 1, which further comprises:

a fluid pressure detection part configured to detect a fluid pressure in the communicating fluid path, wherein the controller has a pressure-hold abnormality detection part configured to control the first communicating valve, the second communicating valve, and the pressure-regulating valve to respective valve-closing directions, and to drive the pump for building up the fluid pressure of the brake fluid in the communicating fluid path, and thereafter to stop the pump, so as to detect a pressure-hold state based on a detected value of the fluid pressure detection part.

6. A brake device comprising:

a fluid path of a primary system equipped with a plurality of wheel cylinders, which are pressurized by a master cylinder pressure produced by a first chamber of a master cylinder that produces a brake fluid pressure by a pedal operation by a driver;

a fluid path of a secondary system equipped with a plurality of wheel cylinders, which are pressurized by a master cylinder pressure produced by a second chamber of the master cylinder;

a communicating fluid path configured to connect the fluid path of the primary system and the fluid path of the secondary system;

a pump configured to discharge brake fluid into the communicating fluid path;

a first communicating valve disposed in the communicating fluid path for restricting a flow of the brake fluid from the communicating fluid path to the fluid path of the primary system;

a second communicating valve disposed in the communicating fluid path for restricting a flow of the brake fluid from the communicating fluid path to the fluid path of the secondary system; and a controller having a pump-state check part configured to separate the communicating fluid path from each of the fluid path of the primary system and the fluid path of the secondary system and to drive the pump for permitting the brake fluid in the communicating fluid path to flow, so as to check a state of the pump, wherein the communicating fluid path is separated from each of the fluid path of the primary system and the fluid path of the secondary system by the first communicating valve and the second communicating valve, and the controller has a one-sided system fluid pressure control part configured to control one communicating valve of the first communicating valve and the second communicating valve in a valve-opening direction, and to control the other communicating valve in a valve-closing direction, and to drive the pump, so as to deliver the brake fluid into the fluid path of the system whose communicating valve has been controlled in the valve-opening direction.

7. A brake device as recited in claim 6, which further comprises:
a reflux fluid path provided between at least one communicating valve of the first communicating valve and the second communicating valve and the pump for returning the brake fluid discharged into the communicating fluid path back to a suction side of the pump;
a pressure-regulating valve disposed in the reflux fluid path; and
a fluid pressure detection part configured to detect a fluid pressure of the brake fluid discharged from the pump; and,
a controller configured to control the first communicating valve, the second communicating valve, the pressure-regulating valve, and the pump,
wherein the controller has a pressure-buildup abnormality detection part configured to control the first communicating valve, the second communicating valve, and the pressure-regulating valve to respective valve-closing directions, and to drive the pump, so as to detect a pressure-buildup state based on a detected value of the fluid pressure detection part.

8. A brake device as recited in claim 7, wherein:
the controller has a pressure-hold abnormality detection part configured to control the first communicating valve, the second communicating valve, and the pressure-regulating valve to respective valve-closing directions, and to drive the pump for building up the fluid pressure of the brake fluid in the communicating fluid path, and thereafter to stop the pump, so as to detect a pressure-hold state based on a detected value of the fluid pressure detection part.

9. A brake device as recited in claim 8, wherein:
the controller has a pressure-reduction abnormality detection part configured to control the first communicating valve, the second communicating valve, and the pressure-regulating valve to respective valve-closing directions, and to drive the pump, and thereafter to reduce the fluid pressure of the brake fluid, whose pressure has been built up, by controlling the pressure-regulating valve to a valve-opening direction, so as to detect a pressure-reduction state based on a detected value of the fluid pressure detection part.

10. A brake device comprising:
a fluid path of a primary system equipped with a plurality of wheel cylinders, which are pressurized by a master cylinder pressure produced by a first chamber of a master cylinder that produces a brake fluid pressure by a pedal operation by a driver;
a fluid path of a secondary system equipped with a plurality of wheel cylinders, which are pressurized by a master cylinder pressure produced by a second chamber of the master cylinder;
a communicating fluid path configured to connect the fluid path of the primary system and the fluid path of the secondary system;
a pump configured to discharge brake fluid into the communicating fluid path;
a first communicating valve disposed in the communicating fluid path for restricting a flow of the brake fluid from the communicating fluid path to the fluid path of the primary system;
a second communicating valve disposed in the communicating fluid path for restricting a flow of the brake fluid from the communicating fluid path to the fluid path of the secondary system;
a reflux fluid path provided between at least one communicating valve of the first communicating valve and the second communicating valve and the pump for returning the brake fluid discharged into the communicating fluid path back to a suction side of the pump;
a pressure-regulating valve disposed in the reflux fluid path; and
a controller having a pump-state check part configured to form a closed circuit between a fluid path of the communicating fluid path combined with the reflux fluid path and the pump by controlling the first communicating valve and the second communicating valve in respective valve-closing directions and to drive the pump for permitting the brake fluid in the communicating fluid path to flow, so as to check a state of the pump, wherein
the controller is configured to control the pressure-regulating valve when checking by the pump-state check part, and
the controller has a one-sided system fluid pressure control part configured to control one communicating valve of the first communicating valve and the second communicating valve in a valve-opening direction, and to control the other communicating valve in a valve-closing direction, and to drive the pump, so as to deliver the brake fluid into the fluid path of the system whose communicating valve has been controlled in the valve-opening direction.

11. A brake device as recited in claim 10, which further comprises:
a reflux fluid path provided between at least one communicating valve of the first communicating valve and the second communicating valve and the pump for returning the brake fluid discharged into the communicating fluid path back to a suction side of the pump;
a pressure-regulating valve disposed in the reflux fluid path;
a fluid pressure detection part configured to detect a fluid pressure of the brake fluid discharged from the pump; and
a controller configured to control the first communicating valve, the second communicating valve, the pressure-regulating valve, and the pump,
wherein the controller has a pressure-buildup abnormality detection part configured to control the first communicating valve, the second communicating valve, and the pressure-regulating valve to respective valve-closing directions, and to drive the pump, so as to detect a pressure-buildup state based on a detected value of the fluid pressure detection part.

12. A brake device as recited in claim 10, wherein:
the controller has a pressure-hold abnormality detection part configured to control the first communicating valve, the second communicating valve, and the pressure-regulating valve to respective valve-closing directions, and to drive the pump for building up the fluid pressure of the brake fluid in the communicating fluid path, and thereafter to stop the pump, so as to detect a pressure-hold state based on a detected value of the fluid pressure detection part.

13. A brake device as recited in claim 10, wherein:
the controller has a pressure-reduction abnormality detection part configured to control the first communicating valve, the second communicating valve, and the pressure-regulating valve to respective valve-closing directions, and to drive the pump, and thereafter to reduce the fluid pressure of the brake fluid, whose pressure has been built up, by controlling the pressure-regulating valve to a valve-opening direction, so as to detect a pressure-reduction state based on a detected value of the fluid pressure detection part.

* * * * *